United States Patent
Bai et al.

(10) Patent No.: US 12,015,576 B2
(45) Date of Patent: Jun. 18, 2024

(54) TECHNIQUES FOR UPDATING TRANSMISSION CONFIGURATION INDICATOR STATES

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/316,574

(22) Filed: May 10, 2021

(65) Prior Publication Data

US 2022/0360406 A1    Nov. 10, 2022

(51) Int. Cl.
*H04L 5/00* (2006.01)
*H04W 48/16* (2009.01)

(52) U.S. Cl.
CPC ............ *H04L 5/0053* (2013.01); *H04L 5/001* (2013.01); *H04W 48/16* (2013.01)

(58) Field of Classification Search
CPC ..... H04L 5/0053; H04L 5/001; H04L 5/0023; H04L 5/0094; H04L 5/0098; H04L 5/0035; H04W 48/16
See application file for complete search history.

(56) References Cited

U.S. PATENT DOCUMENTS

| | | | |
|---|---|---|---|
| 2018/0270040 A1* | 9/2018 | Takaoka | H04L 5/0035 |
| 2021/0105780 A1 | 4/2021 | Jin et al. | |
| 2021/0135802 A1* | 5/2021 | Zhou | H04L 5/001 |

FOREIGN PATENT DOCUMENTS

WO    WO-2021011442 A1 *  1/2021   ........... H04L 5/0023

OTHER PUBLICATIONS

CATT: "Enhancements on Multi-Beam Operation", 3GPP Draft, R1-2100343, 3GPP TSG RAN WG1 #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051970946, 17 Pages, p. 11/17.
International Search Report and Written Opinion—PCT/US2022/019293—ISA/EPO—dated Jun. 30, 2022.

* cited by examiner

*Primary Examiner* — Charles C Jiang
*Assistant Examiner* — Debebe A Asefa
(74) *Attorney, Agent, or Firm* — Holland & Hart LLP

(57) ABSTRACT

Methods, systems, and devices for wireless communications are described. A user equipment (UE) may receive, from a serving cell (e.g., serving base station), an indication to update a transmission configuration indicator (TCI) state of a first component carrier associated with a neighboring cell (e.g., neighboring base station). In some cases, the UE may be configured with a serving cell update rule and a neighboring cell update rule. The UE may determine, in accordance with a neighboring cell update rule, whether to update the TCI state across multiple component carriers (e.g., in a component carrier list) associated with the first component carrier based on the first component carrier being associated with the neighboring cell. The UE may update the TCI state of at least the first component carrier in accordance with the neighboring cell update rule.

30 Claims, 15 Drawing Sheets

TECHNIQUES FOR UPDATING TRANSMISSION CONFIGURATION INDICATOR STATES

FIELD OF TECHNOLOGY

The following relates to wireless communications, including techniques for updating transmission configuration indicator (TCI) states.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a UE may communicate using one or more beams in accordance with a respective transmission configuration indicator (TCI) state. The base station may indicate one or more TCI states that a UE may use for communicating with the base station and in some cases, the base station may indicate an updated TCI state. The UE may update the TCI state accordingly. Techniques for updating a TCI state may be improved.

SUMMARY

The described techniques relate to improved methods, systems, devices, and apparatuses that support techniques for updating transmission configuration indicator (TCI) states. Generally, a user equipment (UE) may be configured with a set of rules for updating TCI states. In some cases, the UE may be configured with a different set of rules for updating a TCI state associated with a serving cell (e.g., serving base station) versus updating a TCI associated with a non-serving cell (e.g., a neighbor cell, neighbor base station, non-serving base station). As such, a UE may be configured to update a TCI state differently, in some cases, based on whether the TCI state is associated with a serving cell reference signal or non-serving cell reference signal in accordance with a rule. For example, a UE may receive, from a serving cell, an indication to update a TCI state of a first component carrier. If the first component carrier is associated with a non-serving cell, the UE may use a non-serving cell update rule to determine whether to update the TCI state for the first component carrier, across multiple component carriers associated with the first component carrier, or for a particular bandwidth part (BWP) associated with the first component carrier. The UE may then use the non-serving cell update rule to apply the update accordingly. In another example, if the first component carrier is associated with a serving cell, the UE may use a serving cell update rule to determine whether to update one or more component carriers associated with the first component carrier. The UE may then use the serving cell update rule to apply the update accordingly.

A method for wireless communications at a UE is described. The method may include receiving, from a serving cell, an indication to update a TCI state of a first component carrier associated with a neighboring cell, determining, in accordance with a neighboring cell update rule, whether to update the TCI state across multiple component carriers associated with the first component carrier based on the first component carrier being associated with the neighboring cell, and updating the TCI state of at least the first component carrier in accordance with the neighboring cell update rule.

An apparatus for wireless communications at a UE is described. The apparatus may include a processor, memory coupled with the processor, and instructions stored in the memory. The instructions may be executable by the processor to cause the apparatus to receive, from a serving cell, an indication to update a TCI state of a first component carrier associated with a neighboring cell, determine, in accordance with a neighboring cell update rule, whether to update the TCI state across multiple component carriers associated with the first component carrier based on the first component carrier being associated with the neighboring cell, and update the TCI state of at least the first component carrier in accordance with the neighboring cell update rule.

Another apparatus for wireless communications at a UE is described. The apparatus may include means for receiving, from a serving cell, an indication to update a TCI state of a first component carrier associated with a neighboring cell, means for determining, in accordance with a neighboring cell update rule, whether to update the TCI state across multiple component carriers associated with the first component carrier based on the first component carrier being associated with the neighboring cell, and means for updating the TCI state of at least the first component carrier in accordance with the neighboring cell update rule.

A non-transitory computer-readable medium storing code for wireless communications at a UE is described. The code may include instructions executable by a processor to receive, from a serving cell, an indication to update a TCI state of a first component carrier associated with a neighboring cell, determine, in accordance with a neighboring cell update rule, whether to update the TCI state across multiple component carriers associated with the first component carrier based on the first component carrier being associated with the neighboring cell, and update the TCI state of at least the first component carrier in accordance with the neighboring cell update rule.

In some examples of the method, apparatuses, and non-transitory computer-readable medium described herein, updating the TCI state may include operations, features, means, or instructions for updating the TCI state across the first component carrier and the multiple component carriers in accordance with the neighboring cell update rule and based on the first component carrier and each component carrier of the multiple component carriers being included in a component carrier list, where the neighboring cell update rule supports updating of the TCI state across the multiple component carriers.

In some examples of the method, apparatuses, and non-transitory computer-readable medium described herein, updating the TCI state may include operations, features, means, or instructions for updating the TCI state across the first component carrier only in accordance with the neighboring cell update rule, where the neighboring cell update rule supports updating of the TCI state for only the first component carrier despite the first component carrier and component carriers of the multiple component carriers being included in a component carrier list.

Some examples of the method, apparatuses, and non-transitory computer-readable medium described herein may further include operations, features, means, or instructions for receiving the neighboring cell update rule via a bit indication in a radio resource control (RRC) message.

Some examples of the method, apparatuses, and non-transitory computer-readable medium described herein may further include operations, features, means, or instructions for receiving an indication of the neighboring cell update rule and the indication to update the TCI state in a same message, the same message being a RRC message, a medium access control element (MAC-CE) message, or a downlink control information (DCI) message.

Some examples of the method, apparatuses, and non-transitory computer-readable medium described herein may further include operations, features, means, or instructions for receiving a message that indicates that the UE may be to update a set of multiple TCI states and receiving one or more indications of a set of multiple neighboring cell update rules, each neighboring cell update rule of the set of multiple neighboring cell update rules associated with one of the set of multiple TCI states being updated, where the UE updates the set of multiple TCI states across one or more component carriers in accordance with the associated neighboring cell update rule.

Some examples of the method, apparatuses, and non-transitory computer-readable medium described herein may further include operations, features, means, or instructions for determining whether the TCI state may be associated with the neighboring cell or the serving cell based on a quasi co-location (QCL) chain, where determining whether to update the TCI state across the multiple component carriers may be based on whether the TCI state may be associated with the neighboring cell or the serving cell.

In some examples of the method, apparatuses, and non-transitory computer-readable medium described herein, determining whether to update the TCI state across the multiple component carriers may include operations, features, means, or instructions for determining to update the TCI state of the first component carrier and to refrain from updating the TCI state across the multiple component carriers in accordance with the neighboring cell update rule and based on the first component carrier being associated with the neighboring cell.

In some examples of the method, apparatuses, and non-transitory computer-readable medium described herein, the TCI state may be included in a pool of TCI states, the pool of TCI states associated with the first component carrier, updating the TCI state may include operations, features, means, or instructions for updating the TCI state across the first component carrier only based on the pool of TCI states being associated with the first component carrier.

In some examples of the method, apparatuses, and non-transitory computer-readable medium described herein, the TCI state may be included in a pool of TCI states, the pool of TCI states associated with the first component carrier and the multiple component carriers, updating the TCI state may include operations, features, means, or instructions for updating the TCI state across the first component carrier and the multiple component carriers based on the pool of TCI states being associated with the first component carrier and the multiple component carriers.

Some examples of the method, apparatuses, and non-transitory computer-readable medium described herein may further include operations, features, means, or instructions for receiving a message indicating a bandwidth part identifier, the bandwidth part identifier associated with a bandwidth part included in the first component carrier and determining that the TCI state may be associated with the neighboring cell based on the bandwidth part identifier.

In some examples of the method, apparatuses, and non-transitory computer-readable medium described herein, updating the TCI state may include operations, features, means, or instructions for updating the TCI state across the bandwidth part associated with the bandwidth part identifier in accordance with the neighboring cell update rule.

Some examples of the method, apparatuses, and non-transitory computer-readable medium described herein may further include operations, features, means, or instructions for determining one or more parameters associated with the neighboring cell based on the bandwidth part identifier.

A method for wireless communications at a base station is described. The method may include transmitting, to a UE, an indication to update a TCI state of a first component carrier associated with a neighboring cell and transmitting a message including a neighboring cell update rule for updating the TCI state across multiple component carriers associated with the first component carrier.

An apparatus for wireless communications at a base station is described. The apparatus may include a processor, memory coupled with the processor, and instructions stored in the memory. The instructions may be executable by the processor to cause the apparatus to transmit, to a UE, an indication to update a TCI state of a first component carrier associated with a neighboring cell and transmit a message including a neighboring cell update rule for updating the TCI state across multiple component carriers associated with the first component carrier.

Another apparatus for wireless communications at a base station is described. The apparatus may include means for transmitting, to a UE, an indication to update a TCI state of a first component carrier associated with a neighboring cell and means for transmitting a message including a neighboring cell update rule for updating the TCI state across multiple component carriers associated with the first component carrier.

A non-transitory computer-readable medium storing code for wireless communications at a base station is described. The code may include instructions executable by a processor to transmit, to a UE, an indication to update a TCI state of a first component carrier associated with a neighboring cell and transmit a message including a neighboring cell update rule for updating the TCI state across multiple component carriers associated with the first component carrier.

In some examples of the method, apparatuses, and non-transitory computer-readable medium described herein, transmitting the message including the neighboring cell update rule may include operations, features, means, or instructions for transmitting a RRC message including a bit, the bit indicating the neighboring cell update rule.

In some examples of the method, apparatuses, and non-transitory computer-readable medium described herein, the message including the neighboring cell update rule and the indication to update the TCI state may be included in a same message, the same message being a RRC message, a MAC-CE message, or a DCI message.

Some examples of the method, apparatuses, and non-transitory computer-readable medium described herein may further include operations, features, means, or instructions for transmitting a second message indicating the UE to update a set of multiple TCI states and transmitting a set of multiple neighboring cell update rules, each neighboring cell update rule of the set of multiple neighboring cell update rules associated with one of the set of multiple TCI states being updated.

In some examples of the method, apparatuses, and non-transitory computer-readable medium described herein, the neighboring cell update rule supports updating, by the UE, of the TCI state across the multiple component carriers.

In some examples of the method, apparatuses, and non-transitory computer-readable medium described herein, the neighboring cell update rule supports updating, by the UE, of the TCI state across the first component carrier only.

DETAILED DESCRIPTION

Figure 1:
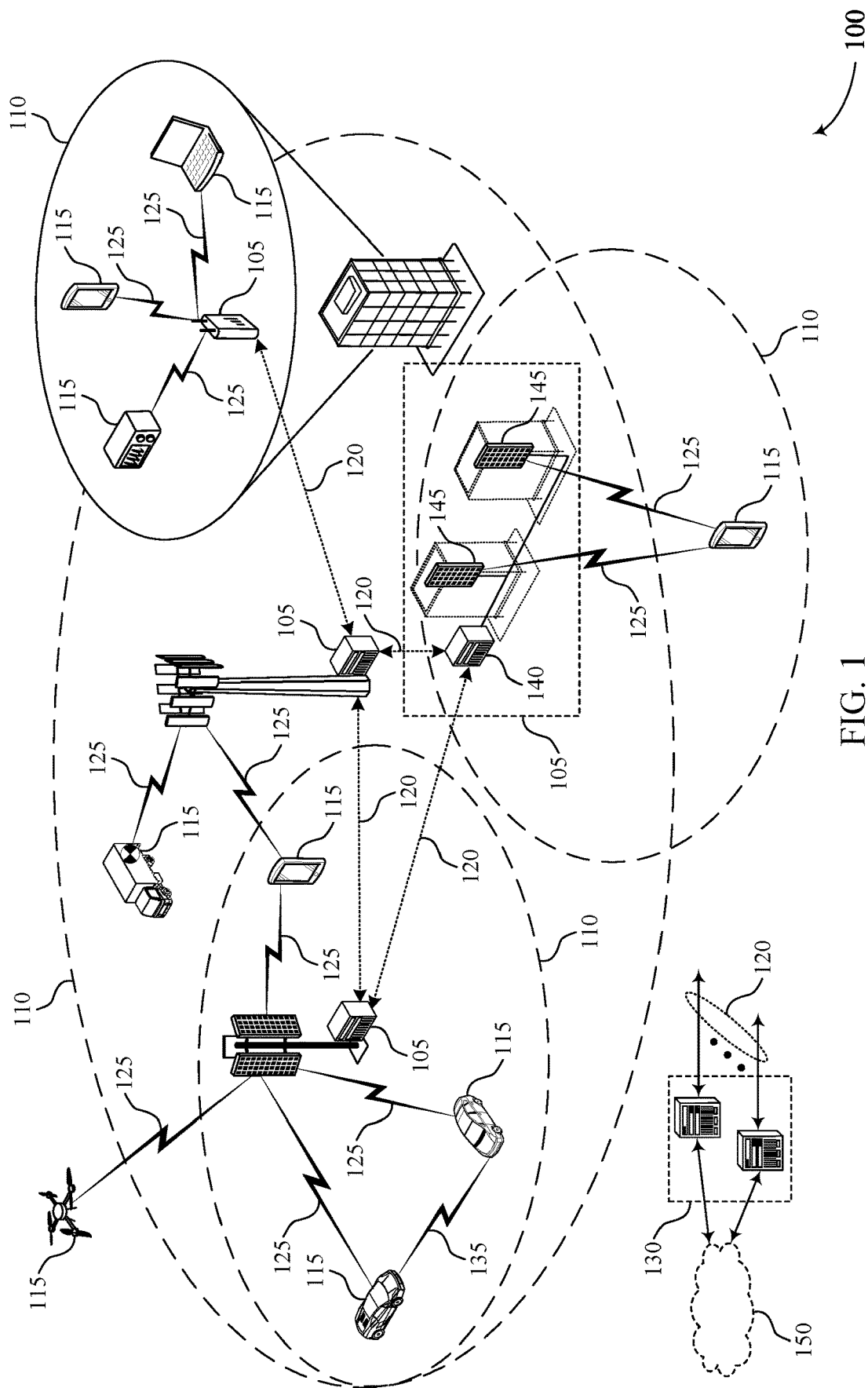
FIG. 1 illustrates an example of a wireless communications system that supports techniques for updating transmission configuration indicator (TCI) states in accordance with aspects of the present disclosure.

In some examples of a wireless communications system, such as a millimeter wave (mmW) system or a new radio (NR) system, wireless communication devices may communicate via directional transmissions (e.g., beams), in which beamforming may be applied using one or more antenna elements to form a beam in a particular direction. Such examples of a wireless communications system may utilize transmission configuration indicator (TCI) states to indicate a beam for transmission or reception by a user equipment (UE). For example, a TCI state may be used to indicate a quasi co-location (QCL) relationship between a downlink (DL) reference signal and an antenna port. For example, a TCI state may be used to indicate to a UE a beam (e.g., a downlink receive beam, an uplink transmit beam) configuration based on a beam configuration of a previously received reference signal.

In some cases (e.g., a UE changes location), a base station may transmit an indication to update one or more TCI states (e.g., one or more parameters associated with a TCI state). In some cases, a TCI state may be configured on a per component carrier or per bandwidth part (BWP) basis. As such, the base station may transmit an indication to update one or more TCI states for a particular component carrier and/or BWP. However, in some frequency ranges (e.g., frequency range 2 (FR2)), the same beams (i.e., beams originating from the same base station) may be used in multiple component carriers. As such, a base station may configure one or more lists of component carriers, where a TCI state update associated with one component carrier included in a component carrier list may apply to all component carriers in the same component carrier list. In such cases, if the UE receives a TCI state update message indicating updated TCI state information for a given component carrier, the UE may apply the updated information to all component carriers in the list. In some cases, applying update information to all component carriers in a component carrier list may reduce overhead associated with updating TCI state information for component carriers associated with a serving cell. However, simultaneous updating of TCI states for multiple component carriers of a neighboring cell may not be appropriate. Rather, if a UE receives an indication to update a TCI state of a particular non-serving cell (e.g., a neighboring cell), the UE may not assume that the same TCI state update applies to all component carriers in a component carrier list.

As described herein, a UE may update TCI states according to different rules (e.g., serving cell update rule, neighboring cell update rule) depending on whether the TCI state is associated with a serving or non-serving cell reference signal (e.g., neighboring cell reference signal). For example, the UE may update a TCI state across all component carriers in a component carrier list for TCI states associated with a serving cell in accordance with a serving cell update rule, but may only update a TCI state associated with the indicated component carrier or BWP for TCI states associated with a non-serving cell in accordance with a neighboring cell update rule. In some cases, a base station may determine, and indicate to a UE, the neighboring cell update rule. For example, the base station may determine, and indicate to the UE, whether the simultaneous update of TCI states across component carriers in a component carrier list may apply to a TCI state of a serving cell only, or may also apply to a TCI state associated with a non-serving cell. For example, if a UE receives an indication to update a non-serving cell TCI state for a particular component carrier, and the indicated component carrier is linked to other component carriers (e.g., via a component carrier list), the UE may either update all linked component carriers or only the indicated component carrier in accordance with a preconfigured neighboring cell update rule. In yet another example, a base station may indicate whether a TCI state update for a non-serving cell may apply to multiple component carriers or to a single BWP (e.g., a single BWP only). In some cases, a UE may implicitly identify whether a TCI state update associated with a non-serving cell reference signal may apply to multiple component carriers based on various parameters and or configurations.

Particular aspects of the subject matter described herein may be implemented to realize one or more advantages. In some cases, enabling a UE to update TCI states differently based on whether a TCI state is associated with a serving cell or non-serving cell may reduce cell switching latency and ensure that the UE is configured with appropriate beamforming configurations to improve reliability, among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to techniques for updating TCI states.

FIG. 1 illustrates an example of a wireless communications system 100 that supports techniques for updating TCI states in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, such as wireless communications systems 100, a base station 105 and a UE 115 may communicate using one or more beams in accordance with a respective TCI state. The base station 105 may indicate one or more TCI states that a UE 115 may use for communicating with the base station 105 and in some cases, the base station 105 may indicate an updated TCI state (e.g., in response to changes in the environment, changes in communication parameters between the UE 115 and base station 105). The UE 115 may update the TCI state in accordance with a TCI state update rule. In some cases, the UE 115 may be configured with a different set of rules for updating a TCI state associated with a serving base station 105 (e.g., serving cell) versus updating a TCI associated with a non-serving base station 105 (e.g., a neighbor cell, neighbor base station 105, non-serving cell). As such, a UE 115 may be configured to update a TCI state differently, in some cases, based on whether the TCI state is associated with a serving base station reference signal or non-serving base station reference signal in accordance with a rule. For example, a UE 115 may receive, from a serving base station 105, an indication to update a TCI state of a first component carrier. If the first component carrier is associated with a non-serving base station 105, the UE 115 may use a non-serving base station update rule to determine whether to update the TCI state for the first component carrier, across multiple component carriers associated with the first component carrier, or for a particular BWP associated with the first component carrier. The UE 115 may then use the non-serving base station update rule to apply the update accordingly. In another example, if the first component carrier is associated with a serving base station 105, the UE 115 may use a serving base station update rule to determine whether to update the TCI state for the first component carrier, across multiple component carriers associated with the first component carrier, or for a particular BWP associated with the first component carrier. The UE 115 may then use the serving base station update rule to apply the update accordingly.

Figure 2:
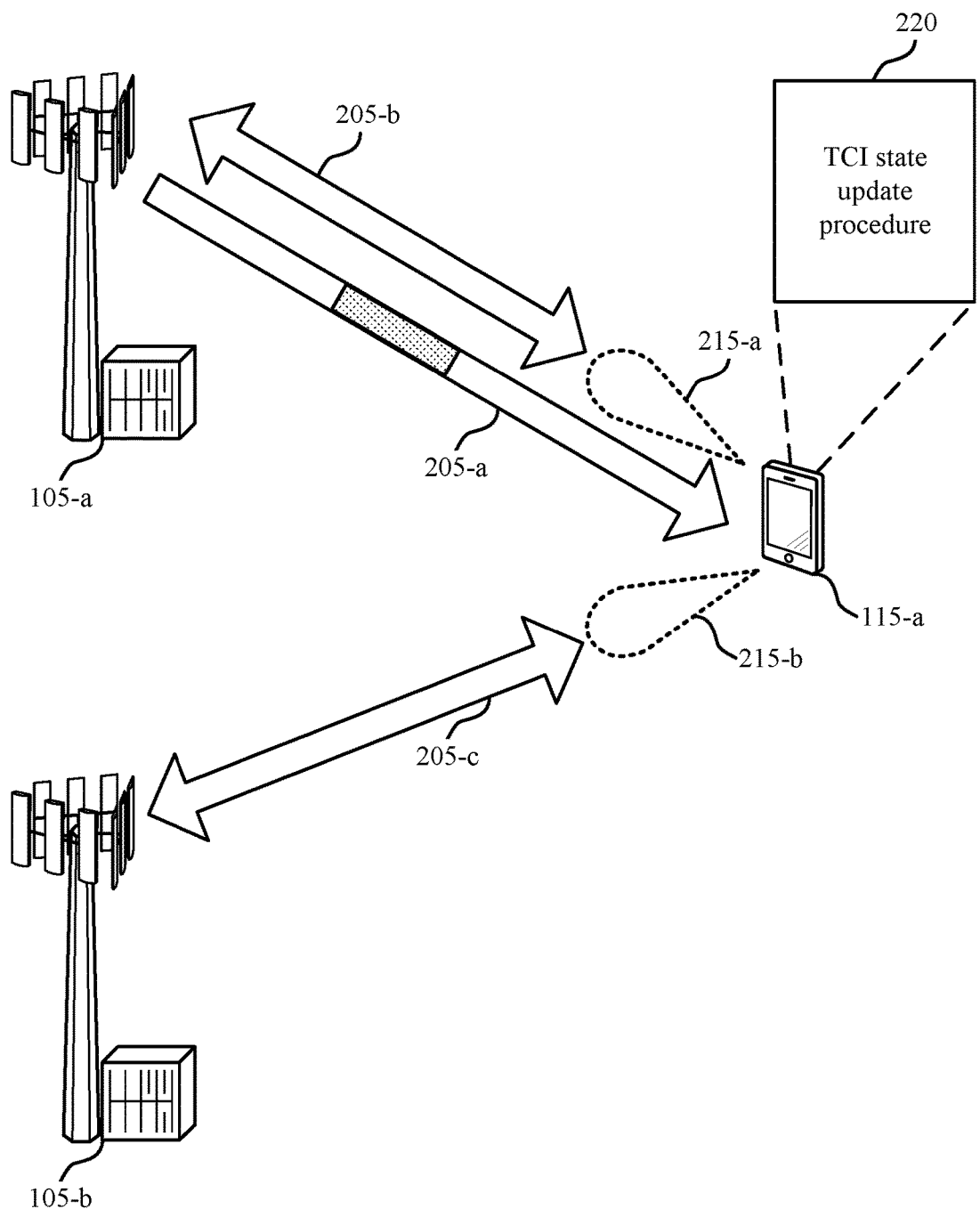
FIG. 2 illustrates an example of a wireless communications system that supports techniques for updating TCI states in accordance with aspects of the present disclosure.

FIG. 2 illustrates an example of a wireless communications system 200 that supports techniques for updating TCI states in accordance with aspects of the present disclosure. In some examples, wireless communication system 200 may support millimeter wave (mmW) communication, new radio (NR) communication, LTE communication, or any other wireless communication. Wireless communications system 200 may include base stations 105-a and 105-b and UE 115-a, which may be examples of a base stations 105 and a UE 115 as described with reference to FIG. 1. Base station 105-a and base station 105-b may each serve a geographic coverage area, where the geographic coverage areas may overlap. In some cases, UE 115-a may implement a TCI state update procedure 220 to assist communications with one or more other devices (e.g., base stations 105, UEs 115).

In some examples, wireless communication devices (e.g., base stations 105, UEs 115) may communicate via directional transmissions (e.g., beams 215), in which beamforming may be applied using one or more antenna elements to form a beam 215 in a particular direction. Such wireless communication systems may utilize TCI states to indicate a beam for transmission or reception by a UE 115 and/or base station 105. A TCI state may indicate a QCL relationship between a downlink reference signal (e.g., CSI-RS, aperiodic CSI-RS (AP-CSI-RS), tracking reference signal (TRS), positioning reference signals (PRS), etc.) and an antenna port. For example, base station 105-a may use a TCI state to indicate to UE 115-a a beam (e.g., uplink transmit beam, downlink receive beam) configuration based on a beam configuration of a previously received reference signal.

Base station 105-a and base station 105-b may communicate with a UE 115 via communication links 205. In some examples, base station 105-a may be a serving base station 105 (e.g., serving cell) of UE 115-a, and base station 105-b may be a neighbor base station 105 to UE 115-a (e.g., non-serving cell, non-serving base station 105, neighbor cell). UE 115-a and base station 105-a may communicate via communications links 205-a and 205-b (e.g., uplink communication links, downlink communication links) and UE 115-b may communicate with base station 105-b via communication link 205-c (e.g., uplink communication links, downlink communication links). In some cases, UE 115-a may communicate using a beam 215. For example, UE 115-a may use beam 215-a to communicate over communications link 205-b and use beam 215-b to communicate over communications link 205-e. Beam 215-a and beam 215-b may each be associated with a TCI state.

In some cases, base station 105-a may use communication link 205-a to transmit a TCI state update indication 210 to UE 115-a. In some instances, a TCI state update indication 210 may be signaled via a medium access control (MAC) control element (CE), radio resource control (RRC) messaging, or downlink control information (DCI) transmissions. UE 115-a may perform TCI state update procedure 220 based on receiving TCI state update indication 210. In accordance with the TCI state update procedure 220, UE 115-a may update one or more parameters associated with a TCI state, or identify a new TCI state to use for communicating with base station 105-a, base station 105-b, or both. The updated TCI state may be associated with (e.g., indicate) a beam 215, such as beam 215-a, or beam 215-b. For example, based on performing TCI update procedure 220, UE 115-a may determine to use beam 215-a to receive and or transmit communications via communication link 205-b.

A TCI state may be configured on a per component carrier or per bandwidth part (BWP) basis and may be associated with a particular base station (e.g., cell). For example, an activated TCI state for a physical downlink shared channel (PDSCH) may be configured on a per BWP and/or component carrier basis. In another example, the spatial relationship information (e.g., uplink beam indication) for a physical uplink control channel (PUCCH) may be configured on a per BWP and/or component carrier basis. In some cases, a TCI state update indication 210 may include the identity of an associated cell (e.g., a cell ID) and an associated BWP (e.g., a BWP ID). The TCI state update indication 210 may be included in a MAC-CE message. In some cases, the TCI state update indication 210 may activate or deactivate a TCI state, where the TCI state activation and/or deactivation for may be for a UE-specific PDSCH MAC-CE. In some cases, the TCI state activation and/or deactivation for a UE-specific PDSCH MAC-CE may be identified by a MAC subheader with a logical channel identifier (LCID). The MAC subheader may have a variable size including at least a cell ID field (e.g., a serving cell ID field), and a BWP part field. The cell ID field may indicate the identity of the serving cell for which the MAC-CE applies (e.g., for which the TCI update applies), where the length of the cell ID field may be five bits, in some cases. The BWP ID field may indicate a DL BWP for which the MAC-CE applies as a codepoint of a DCI BWP indicator field, where the length of the BWP ID field may equal two bits, in some cases.

The serving cell ID may indicate a component carrier associated with the serving cell. In some frequency ranges (e.g., frequency range 2 (FR2)), the same beams (i.e., beams originating from the same base station 105) may be used in multiple component carriers. As such, UE 115-a may be configured with one or more lists of component carriers. In some cases, UE 115-a may be configured with up to two component carrier lists (e.g., simultaneousTCI-UpdateList1-r16, simultaneousTCI-UpdateList2-r16), where a TCI state update associated with one component carrier included in a component carrier list may apply to all component carriers in the same component carrier list. For example, base station 105-a may transmit a TCI state update indication 210 to UE 115-a for a particular component carrier (e.g., indicated by a serving cell ID). In some cases (e.g., if the indicated component carrier is included in a component carrier list), the TCI state update procedure 220 performed by UE 115-a may include UE 115-a applying the updated information to all component carriers in the component carrier list. In some cases, UE 115-a may be configured to ignore the BWP ID included in the TCI state update indication 210 to simultaneously update multiple component carriers in a component carrier list. For example, if the component carrier indicated in the TCI state update indication 210 is included in a component carrier list, UE 115-a may ignore the BWP ID. In some instances, simultaneously updating all component carriers in a component carrier list in accordance with the TCI state update indication 210 may reduce overhead associated with updating TCI state information for multiple component carriers associated with base station 105-a (e.g., a serving cell).

In some implementations, UE 115-a may be configured with one or more TCI states associated with serving base station 105-a and/or one or more TCI states associated with one or more neighbor base stations, such as base station 105-b. Such configurations may facilitate efficient mobility (e.g., Layer 1 (L1)/Layer 2 (L2) mobility) of UE 115-a between serving base station 105-a and a neighbor base station 105. In some cases, such configurations may support an efficient switch (e.g., fast switch) of data and/or control channels to TCI states of other (e.g., neighbor) cell beams and may support enhanced measurement of other cell beams by associating one or more reference signals (e.g., AP-CSI-RS, TRS) to another cells TCI state.

In some cases, one or more parameters (e.g., physical cell ID (PCI), BWP ID, frequency raster parameters, etc.) may be different for non-serving cells than for serving cells and may also be different for different non-serving cells. For example, UE 115-a may use an identified PCI to determine a scrambling sequence of a reference signal. Therefore, when a UE 115 switches TCI states between different base stations 105, the UE 115 may identify one or more parameters associated with the base station 105 the UE 115 is switching to. In some cases, the serving base station 105 may indicate to the UE 115 one or more parameters associated with one or more neighbor base stations 105. In some implementations, to reduce overhead, one or more parameters and/or a TCI state of a neighbor base station 105 may be associated (e.g., mapped to) a particular BWP (e.g., BWP ID). A UE 115 may be configured with one or more parameters and/or one or more TCI states associated with one or more neighbor base stations 105. The UE 115 may be preconfigured with such mapping, or receive a message (e.g., DCI message, MAC-CE message, RRC message), such as from a serving base station 105, indicating the mapping.

Therefore, upon receiving a TCI state update indication 210 indicating a TCI state associated with a non-serving base station reference signal, the UE 115 may need to identify the BWP ID associated with the TCI state update indication 210 to determine the parameters associated with the non-serving base station 105. However, if the TCI state update indication 210 is associated with a component carrier included in a component carrier list, then the UE 115 may be configured to ignore the BWP ID. Therefore, the UE 115 may be unable to determine the parameters for the neighboring base station 105 associated with the indicated TCI state. Additionally or alternatively, the configurations of TCI states associated with non-serving base station reference signals may also be different across component carriers. As such, for neighboring base stations 105, it should not be assumed that the same reference signal configuration applies across multiple component carriers. Therefore, the rule that configures a UE 115 to simultaneous update a TCI state for the indicated component carrier and across all component carriers in a list if the component carrier is included in a list may result in unreliable communication if applied to TCI states associated with non-serving base stations 105.

To improve communication reliability and enable efficient mobility of a UE 115, a UE 115 may update TCI states according to different rules based on whether the TCI state is associated with a serving base station 105 (e.g., base station 105-*a*) or a neighbor base station 105 (e.g., base station 105-*b*). For example, UE 115-*a* may be configured with (e.g., preconfigured with, or receive signaling indicating) a neighbor cell update rule for updating TCI states associated with neighbor cells (e.g., base station 105-*b*), and a serving cell update rule for updating TCI states associated with a serving cell (e.g., base station 105-*a*). In an example, UE 115-*a* may update a TCI state across all component carriers in a component carrier list for TCI states associated with base station 105-*a* in accordance with a serving cell update rule, but only update a TCI state associated with the indicated component carrier or BWP for TCI states associated with base station 105-*b*, regardless of whether the indicated component carrier is included in a component carrier list in accordance with a neighbor cell update rule. In some cases, if UE 115-*a* receives a TCI state update indication 210 for a component carrier associated with base station 105-*b*, and the indicated component carrier is linked to other component carriers (e.g., via a component carrier list), UE 115-*a* may either update all linked component carriers or only the indicated component carrier in accordance with a neighbor cell update rule. For example, in some cases, the neighbor cell update rule may indicate to UE 115-*a* to update the TCI state for only the indicated component carrier. In another example, the neighbor cell may indicate to UE 115-*a* to update the TCI state for the indicate component carrier and all component carriers linked to the indicated component carrier (e.g., if the indicated component carrier is included in a component carrier list).

In some cases, base station 105-*a* may determine, and indicate (e.g., via TCI state update indication 210, or some other message) to UE 115-*a*, whether a simultaneous update of TCI states across component carriers in a component carrier list may apply to a TCI state associated with base station 105-*a*, or may also apply to a TCI state associated with base station 105-*b*. In some cases, base station 105-*a* may include such an indication in an RRC message, and may be included in the RRC message as one bit. For example, a 0-bit may indicate that the simultaneous TCI state update across component carriers in a list for a neighbor cell TCI state is disabled, and 1-bit may indicate that the simultaneous TCI state update across component carriers in a list for a neighbor cell TCI state is enabled.

In some implementations, base station 105-*a* may indicate, via TCI state update indication 210, or some other message, whether a TCI state update may apply to multiple component carriers, or to a single BWP only on a per TCI state basis. As such, the indication may include a bit for each TCI state being updated, where the one bit may indicate a rule for the associated TCI state. For example, a 0-bit may indicate that UE 115-*a* may update the TCI state for the indicate BWP only, and a 1-bit may indicate that UE 115-*a* may update the TCI state for the indicate component carrier and for each component carrier included in a component carrier list (e.g., if the indicated component carrier is included in a component carrier list). In some cases, base station 105-*a* may include such an indication in an RRC message, DCI message, or MAC-CE message.

In some cases, UE 115-*a* may determine whether an indicated TCI state is associated with a serving base station 105 or neighboring base station 105 based on a QCL source reference signal associated with the TCI state indicated in the TCI state update indication 210. For example, a TCI state may be associated with a QCL source reference signal and/or corresponding root QCL source reference signal configured for a neighbor base station 105. UE 115-*a* may receive a TCI state update indication 210, identify the TCI state included in the indication, and determine whether the TCI state is associated with a QCL source reference signal or QCL chain configured for a neighbor base station 105. If the indicated TCI state is associated with a neighboring base station 105, UE 115-*a* may update the TCI state across the indicated component carrier, indicated BWP, or across multiple component carriers associated with an indicated component carrier in accordance with a neighbor cell update rule.

In some cases, UE 115-*a* may implicitly identify whether a TCI state update associated with base station 105-*b* may apply to multiple component carriers in a component carrier list based on various parameters and/or configurations. For example, in some cases, a common TCI state ID may be applied to multiple component carriers with a QCL source reference signal associated with (e.g., configured for) a neighboring cell. In some cases, a separate TCI pool (e.g., pool of TCI state IDs) may be configured per component. Then the TCI state configured for the component carrier indicated by a common TCI state ID may have at least one QCL source reference signal configured for a neighboring cell. In such cases, UE 115-*a* may determine not to perform simultaneous update of the TCI state across multiple component carriers. In some cases, a common TCI pool may be configured for all component carriers. Then the QCL source reference signal indicated by the common TCI ID may have at least one QCL source reference signal configured for a neighboring cell, where the QCL source reference signal indicated by the common ID may be a different reference signal on different component carriers but with same reference signal ID as indicated by the common TCI state ID. In this case, UE 115-*a* may simultaneously update the TCI state indicated by the TCI state ID for multiple component carriers. In implementations, the source reference signal associated with (e.g., configured for) a neighboring cell may be configured under the serving cell information element (IE), with its own QCL source reference signal from a reference signal configured under one neighboring cell. In implementations, the source reference signal associated with (e.g., configured for) a neighboring cell may be configured under a neighboring cell IE (e.g., non-serving cell IE).

Enabling UE 115-*a* to update TCI states differently depending on whether the TCI state is associated with base station 105-*a* or base station 105-*b* may reduce cell switching latency and ensure that UE 115-*a* is configured with appropriate communication beams to improve reliability. Accordingly, UE 115-*a* may receive TCI state update indication 210 from base station 105_a (e.g., serving base station 105-a) indicating a TCI state to be updated by UE 115-a. UE 115-a may determine whether the indicated TCI state is associated with base station 105-a or base station 105-b. If the TCI state is associated with base station 105-a, UE 115-a may perform a TCI state update procedure 220 in accordance with a serving cell update rule and UE 115-a may communicate with base station 105-a via communication link 205-b using beam 215-a, where beam 215-a is associated with the update TCI state. If the TCI state is associated with base station 105-b, UE 115-a may perform a TCI state update procedure 220 in accordance with a neighboring cell update rule and UE 115-a may communicate with base station 105-b via communication link 205-v using beam 215-b, where beam 215-b is associated with the update TCI state.

Figure 3:
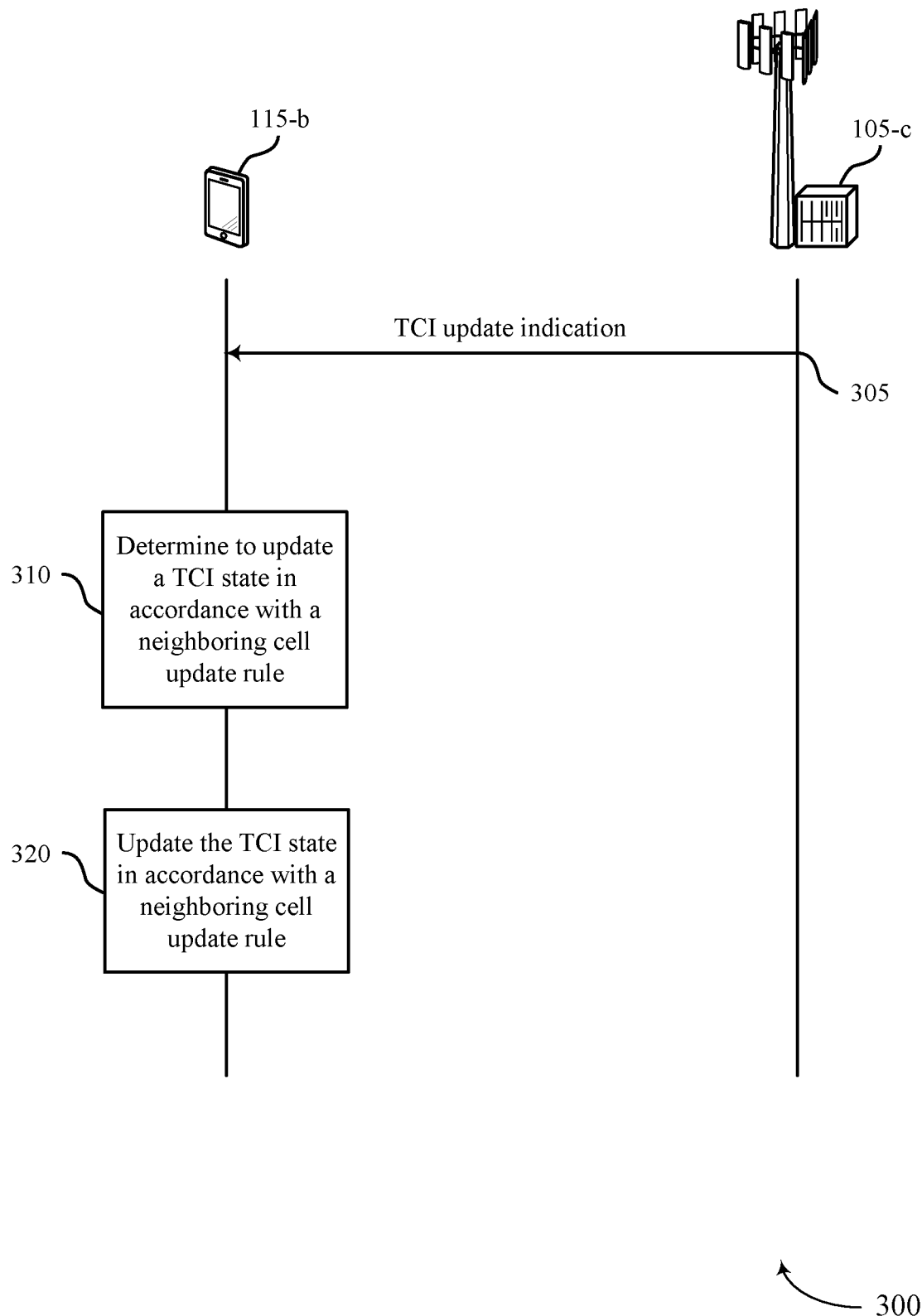
FIG. 3 illustrates an example of a process flow that supports techniques for updating TCI states in accordance with aspects of the present disclosure.

FIG. 3 illustrates an example of a process flow 300 that supports techniques for updating TCI states in accordance with aspects of the present disclosure. The process flow 300 may illustrate an example TCI state updating procedure. For example, UE 115-b may update a TCI state in accordance with a serving cell update rule or a neighboring cell update rule. Base station 105-c and UE 115-b may be examples of the corresponding wireless devices described with reference to FIGS. 1 and 2. In some cases, instead of UE 115-b implementing the TCI state update procedure, a different type of wireless device (e.g., a base station 105) may perform the same or a similar procedure. Alternative examples of the following may be implemented, where some steps are performed in a different order than described or are not performed at all. In some cases, steps may include additional features not mentioned below, or further steps may be added.

At 305, UE 115-b may receive, from a serving cell (e.g., base station 105-c), an indication to update a TCI state of a first component carrier associated with a neighboring cell (e.g., neighboring base station 105).

In some cases, UE 115-b may receive a neighboring cell update rule via a bit indication in an RRC message. In some cases, UE 115-b may receive an indication of the neighboring cell update rule and the indication to update the TCI state in a same message, where the same message may be a RRC message, a MAC-CE message, or a DCI message.

At 310, UE 115-b may determine, in accordance with a neighboring cell update rule, whether to update the TCI state across multiple component carriers associated with the first component carrier based on the first component carrier being associated with the neighboring cell. In some implementations, UE 115-a may determine whether the TCI state is associated with the neighboring cell or the serving cell based on a QCL chain, where determining whether to update the TCI state across the multiple component carriers is based on whether the TCI state is associated with the neighboring cell or the serving cell.

In some cases, determining whether to update the TCI state across the multiple component carriers may include UE 115-b determining to update the TCI state of the first component carrier and to refrain from updating the TCI state across the multiple component carriers in accordance with the neighboring cell update rule and based on the first component carrier being associated with the neighboring cell.

At 315, UE 115-b may update the TCI state of at least the first component carrier in accordance with the neighboring cell update rule.

In some cases, updating the TCI state may include UE 115-b updating the TCI state across the first component carrier and the multiple component carriers in accordance with the neighboring cell update rule and based on the first component carrier and each component carrier of the multiple component carriers being included in a component carrier list. The neighboring cell update rule may support updating of the TCI state across the multiple component carriers.

In some cases, updating the TCI state may include UE 115-b updating the TCI state across the first component carrier only in accordance with the neighboring cell update rule. The neighboring cell update rule may support updating of the TCI state for only the first component carrier despite the first component carrier and component carriers of the multiple component carriers being included in a component carrier list.

In some cases, UE 115-b may receive a message that indicates that UE 115-a is to update a set of TCI states, and may receive one or more indications of a plurality of neighboring cell update rules. Each neighboring cell update rule of the plurality of neighboring cell update rules may be associated with one of the plurality of TCI states being updated. As such, UE 115-a may update the plurality of TCI states across one or more component carriers in accordance with the associated neighboring cell update rule.

In some implementations, the TCI state may be included in a pool of TCI states, where the pool of TCI states may be associated with the first component carrier. Accordingly, updating the TCI state may include UE 115-a, updating the TCI state across the first component carrier only based on the pool of TCI states being associated with the first component carrier.

In some implementations, the TCI state is included in a pool of TCI states, where the pool of TCI states associated with the first component carrier and the multiple component carriers. Accordingly, updating the TCI state may include UE 115-b updating the TCI state across the first component carrier and the multiple component carriers based on the pool of TCI states being associated with the first component carrier and the multiple component carriers.

In some implementations, UE 115-b may receive a message indicating a bandwidth part identifier, where the bandwidth part identifier may be associated with a bandwidth part included in the first component carrier. UE 115-b may determine that the TCI state is associated with the neighboring cell based on the bandwidth part identifier. In some cases, updating the TCI state may include UE 115-b updating the TCI state across the bandwidth part associated with the bandwidth part identifier in accordance with the neighboring cell update rule. In some cases, UE 115-b may determine one or more parameters associated with the neighboring cell based on the bandwidth part identifier.

Figure 4:
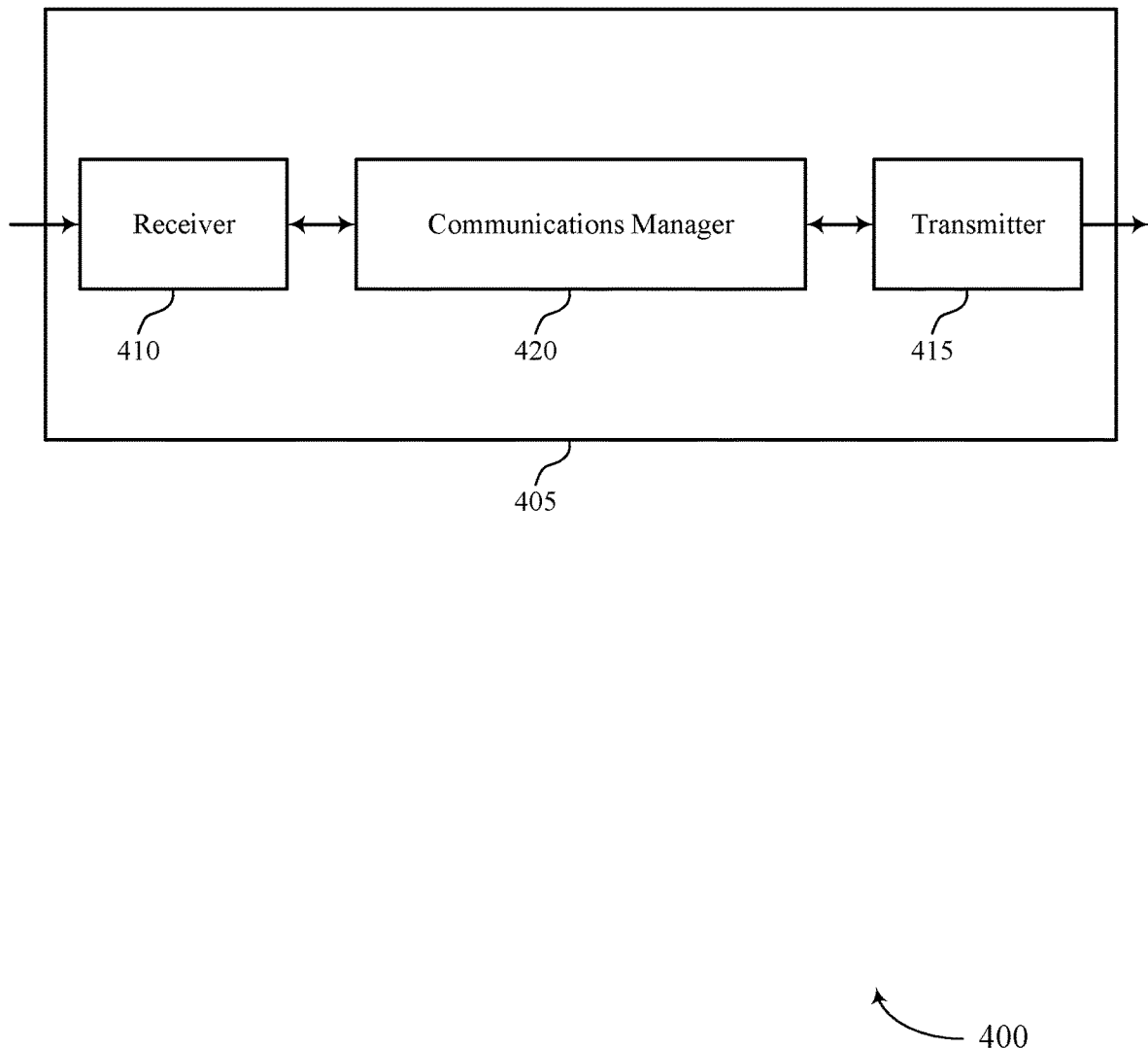
FIGS. 4 and 5 show block diagrams of devices that support techniques for updating TCI states in accordance with aspects of the present disclosure.

FIG. 4 shows a block diagram 400 of a device 405 that supports techniques for updating TCI states in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for updating TCI states). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for updating TCI states). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for updating TCI states as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a serving cell, an indication to update a TCI state of a first component carrier associated with a neighboring cell. The communications manager 420 may be configured as or otherwise support a means for determining, in accordance with a neighboring cell update rule, whether to update the TCI state across multiple component carriers associated with the first component carrier based on the first component carrier being associated with the neighboring cell. The communications manager 420 may be configured as or otherwise support a means for updating the TCI state of at least the first component carrier in accordance with the neighboring cell update rule.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
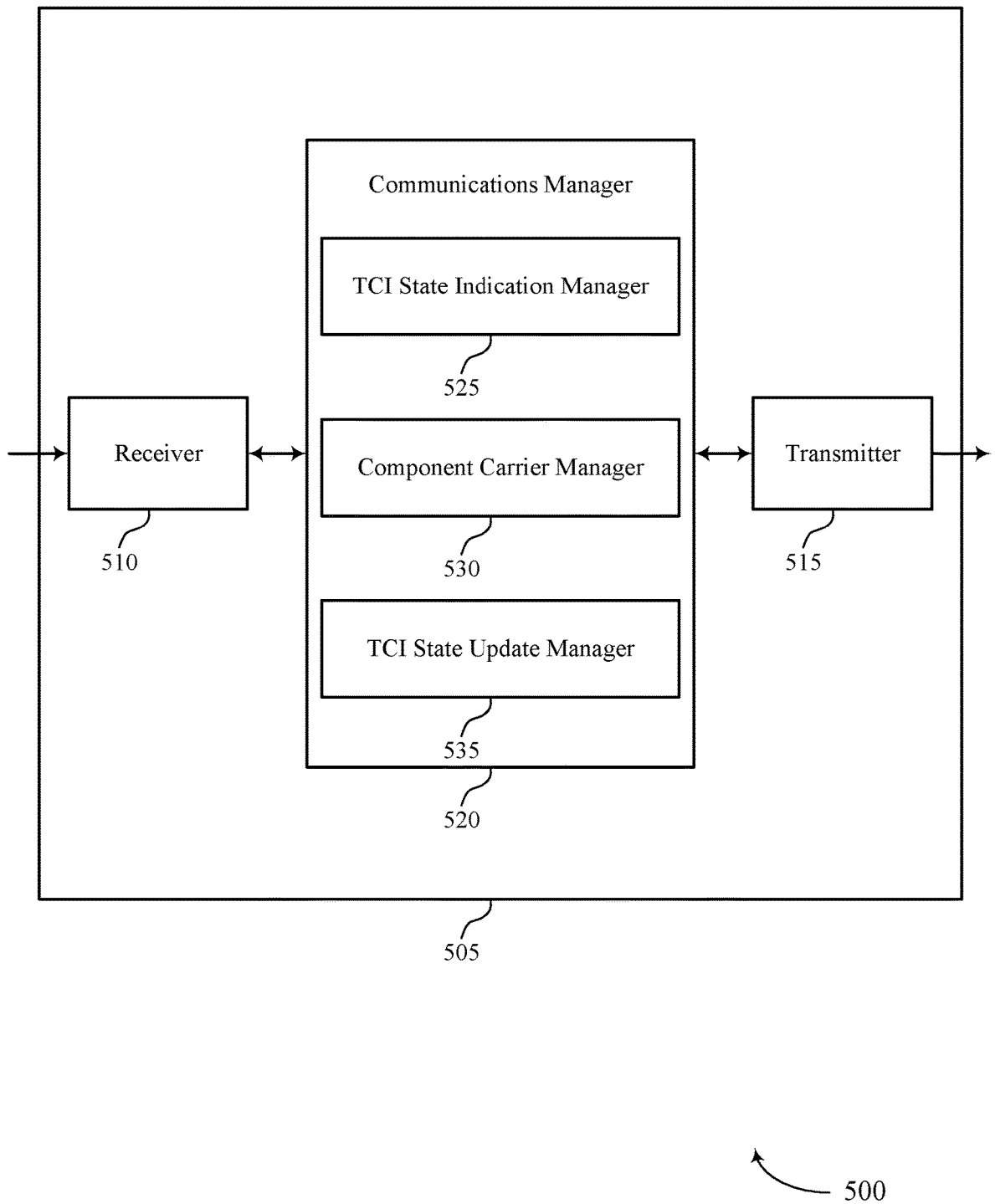

FIG. 5 shows a block diagram 500 of a device 505 that supports techniques for updating TCI states in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for updating TCI states). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for updating TCI states). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for updating TCI states as described herein. For example, the communications manager 520 may include a TCI state indication manager 525, a component carrier manager 530, a TCI state update manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The TCI state indication manager 525 may be configured as or otherwise support a means for receiving, from a serving cell, an indication to update a TCI state of a first component carrier associated with a neighboring cell. The component carrier manager 530 may be configured as or otherwise support a means for determining, in accordance with a neighboring cell update rule, whether to update the TCI state across multiple component carriers associated with the first component carrier based on the first component carrier being associated with the neighboring cell. The TCI state update manager 535 may be configured as or otherwise support a means for updating the TCI state of at least the first component carrier in accordance with the neighboring cell update rule.

Figure 6:
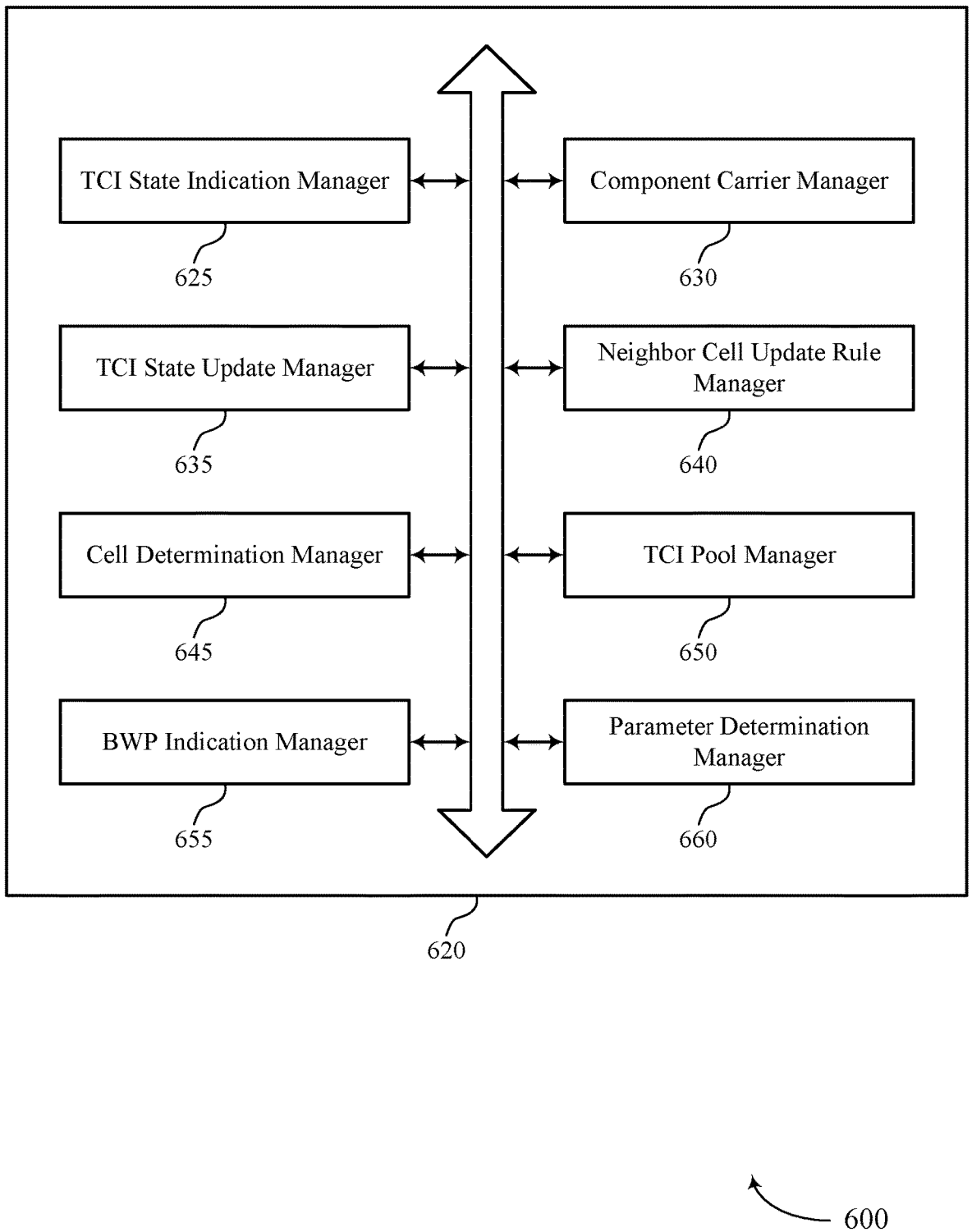
FIG. 6 shows a block diagram of a communications manager that supports techniques for updating TCI states in accordance with aspects of the present disclosure.

FIG. 6 shows a block diagram 600 of a communications manager 620 that supports techniques for updating TCI states in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for updating TCI states as described herein. For example, the communications manager 620 may include a TCI state indication manager 625, a component carrier manager 630, a TCI state update manager 635, a neighbor cell update rule manager 640, a cell determination manager 645, a TCI pool manager 650, a BWP indication manager 655, a parameter determination manager 660, or any combination thereof. Each of these components may communicate, directly or indirectly, with one another (e.g., via one or more buses).

The communications manager 620 may support wireless communications at a UE in accordance with examples as disclosed herein. The TCI state indication manager 625 may be configured as or otherwise support a means for receiving, from a serving cell, an indication to update a TCI state of a first component carrier associated with a neighboring cell. The component carrier manager 630 may be configured as or otherwise support a means for determining, in accordance with a neighboring cell update rule, whether to update the TCI state across multiple component carriers associated with the first component carrier based on the first component carrier being associated with the neighboring cell. The TCI state update manager 635 may be configured as or otherwise support a means for updating the TCI state of at least the first component carrier in accordance with the neighboring cell update rule.

In some examples, to support updating the TCI state, the TCI state update manager 635 may be configured as or otherwise support a means for updating the TCI state across the first component carrier and the multiple component carriers in accordance with the neighboring cell update rule and based on the first component carrier and each component carrier of the multiple component carriers being included in a component carrier list, where the neighboring cell update rule supports updating of the TCI state across the multiple component carriers.

In some examples, to support updating the TCI state, the TCI state update manager 635 may be configured as or otherwise support a means for updating the TCI state across the first component carrier only in accordance with the neighboring cell update rule, where the neighboring cell update rule supports updating of the TCI state for only the first component carrier despite the first component carrier and component carriers of the multiple component carriers being included in a component carrier list.

In some examples, the neighbor cell update rule manager 640 may be configured as or otherwise support a means for receiving the neighboring cell update rule via a bit indication in a RRC message.

In some examples, the neighbor cell update rule manager 640 may be configured as or otherwise support a means for receiving an indication of the neighboring cell update rule and the indication to update the TCI state in a same message, the same message being a RRC message, a MAC-CE message, or a DCI message.

In some examples, the TCI state indication manager 625 may be configured as or otherwise support a means for receiving a message that indicates that the UE is to update a set of multiple TCI states. In some examples, the neighbor cell update rule manager 640 may be configured as or otherwise support a means for receiving one or more indications of a set of multiple neighboring cell update rules, each neighboring cell update rule of the set of multiple neighboring cell update rules associated with one of the set of multiple TCI states being updated, where the UE updates the set of multiple TCI states across one or more component carriers in accordance with the associated neighboring cell update rule.

In some examples, the cell determination manager 645 may be configured as or otherwise support a means for determining whether the TCI state is associated with the neighboring cell or the serving cell based on a QCL chain, where determining whether to update the TCI state across the multiple component carriers is based on whether the TCI state is associated with the neighboring cell or the serving cell.

In some examples, to support determining whether to update the TCI state across the multiple component carriers, the component carrier manager 630 may be configured as or otherwise support a means for determining to update the TCI state of the first component carrier and to refrain from updating the TCI state across the multiple component carriers in accordance with the neighboring cell update rule and based on the first component carrier being associated with the neighboring cell.

In some examples, to support TCI state is included in a pool of TCI states, the pool of TCI states associated with the first component carrier, updating the TCI state, the TCI pool manager 650 may be configured as or otherwise support a means for updating the TCI state across the first component carrier only based on the pool of TCI states being associated with the first component carrier.

In some examples, to support TCI state is included in a pool of TCI states, the pool of TCI states associated with the first component carrier and the multiple component carriers, updating the TCI state, the TCI pool manager 650 may be configured as or otherwise support a means for updating the TCI state across the first component carrier and the multiple component carriers based on the pool of TCI states being associated with the first component carrier and the multiple component carriers.

In some examples, the BWP indication manager 655 may be configured as or otherwise support a means for receiving a message indicating a bandwidth part identifier, the bandwidth part identifier associated with a bandwidth part included in the first component carrier. In some examples, the cell determination manager 645 may be configured as or otherwise support a means for determining that the TCI state is associated with the neighboring cell based on the bandwidth part identifier.

In some examples, to support updating the TCI state, the TCI state update manager 635 may be configured as or otherwise support a means for updating the TCI state across the bandwidth part associated with the bandwidth part identifier in accordance with the neighboring cell update rule.

In some examples, the parameter determination manager 660 may be configured as or otherwise support a means for determining one or more parameters associated with the neighboring cell based on the bandwidth part identifier.

Figure 7:
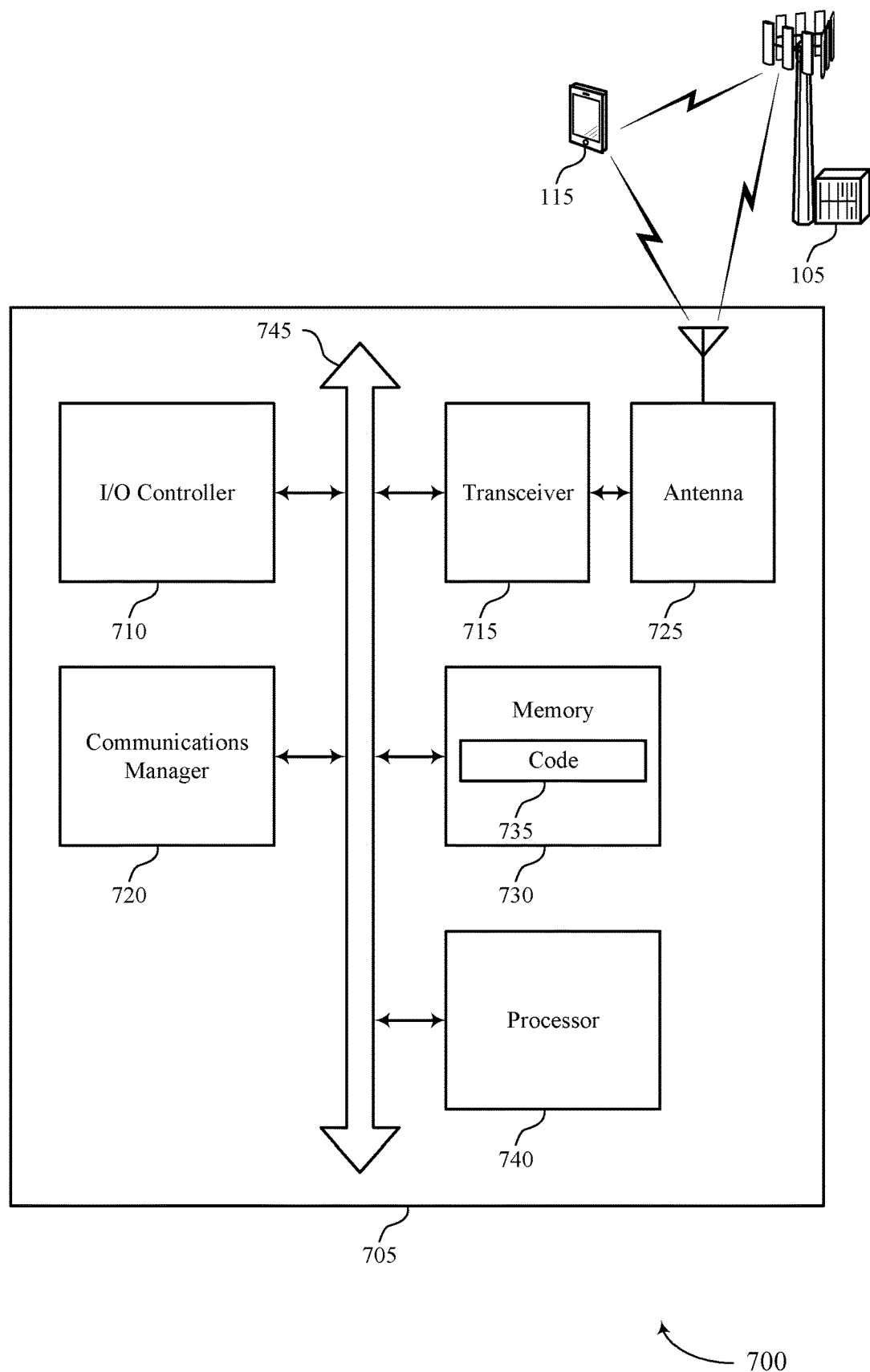
FIG. 7 shows a diagram of a system including a device that supports techniques for updating TCI states in accordance with aspects of the present disclosure.

FIG. 7 shows a diagram of a system 700 including a device 705 that supports techniques for updating TCI states in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for updating TCI states). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a serving cell, an indication to update a TCI state of a first component carrier associated with a neighboring cell. The communications manager 720 may be configured as or otherwise support a means for determining, in accordance with a neighboring cell update rule, whether to update the TCI state across multiple component carriers associated with the first component carrier based on the first component carrier being associated with the neighboring cell. The communications manager 720 may be configured as or otherwise support a means for updating the TCI state of at least the first component carrier in accordance with the neighboring cell update rule.

By including or configuring the communications manager 720 in accordance with examples as described herein, the device 705 may support techniques for improved communication reliability, reduced latency, more efficient utilization of communication resources, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for updating TCI states as described herein, or the processor 740 and the memory 730 may be otherwise configured to perform or support such operations.

Figure 8:
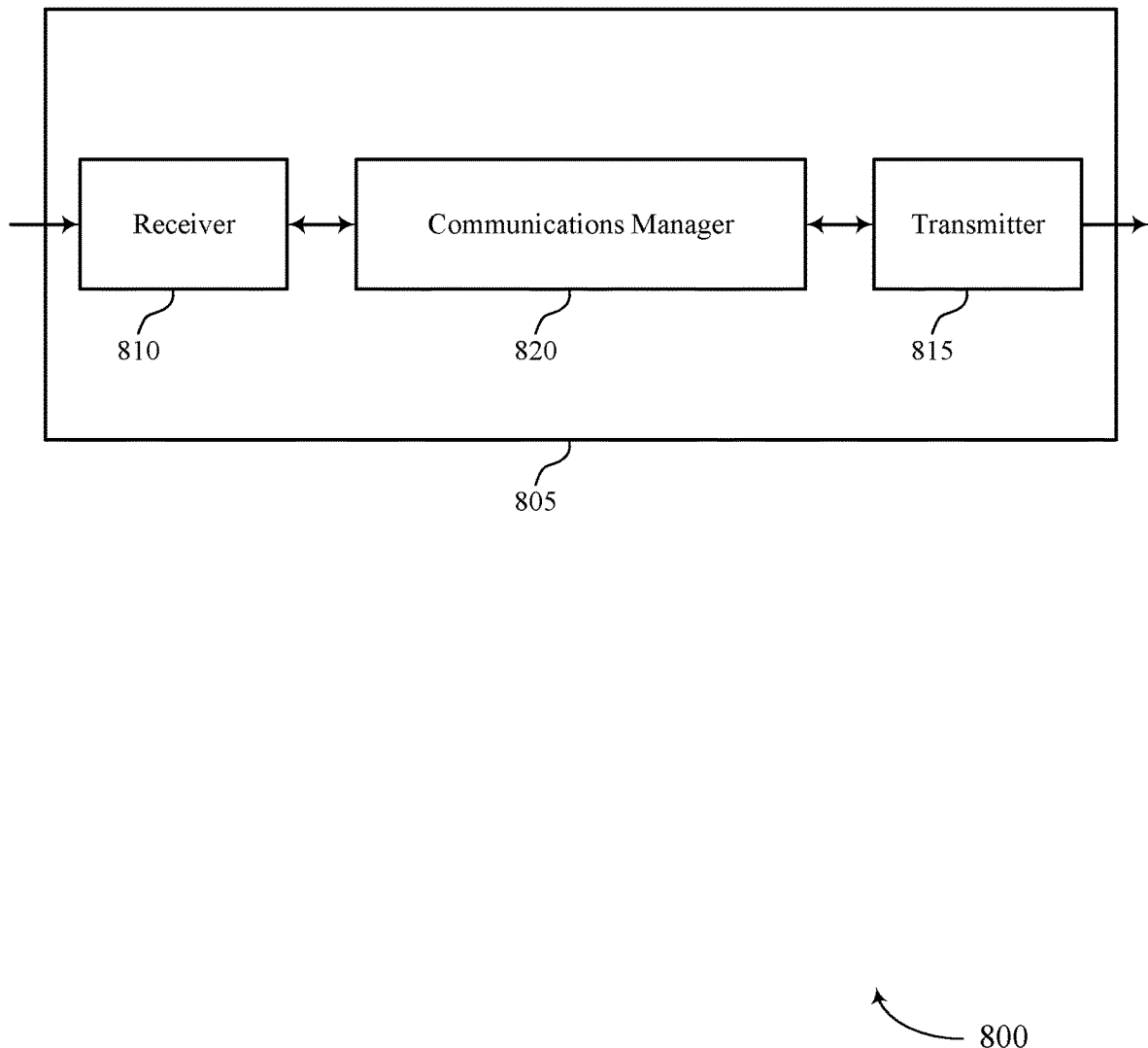
FIGS. 8 and 9 show block diagrams of devices that support techniques for updating TCI states in accordance with aspects of the present disclosure.

FIG. 8 shows a block diagram 800 of a device 805 that supports techniques for updating TCI states in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for updating TCI states). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for updating TCI states). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for updating TCI states as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, an indication to update a TCI state of a first component carrier associated with a neighboring cell. The communications manager 820 may be configured as or otherwise support a means for transmitting a message including a neighboring cell update rule for updating the TCI state across multiple component carriers associated with the first component carrier.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources.

Figure 9:
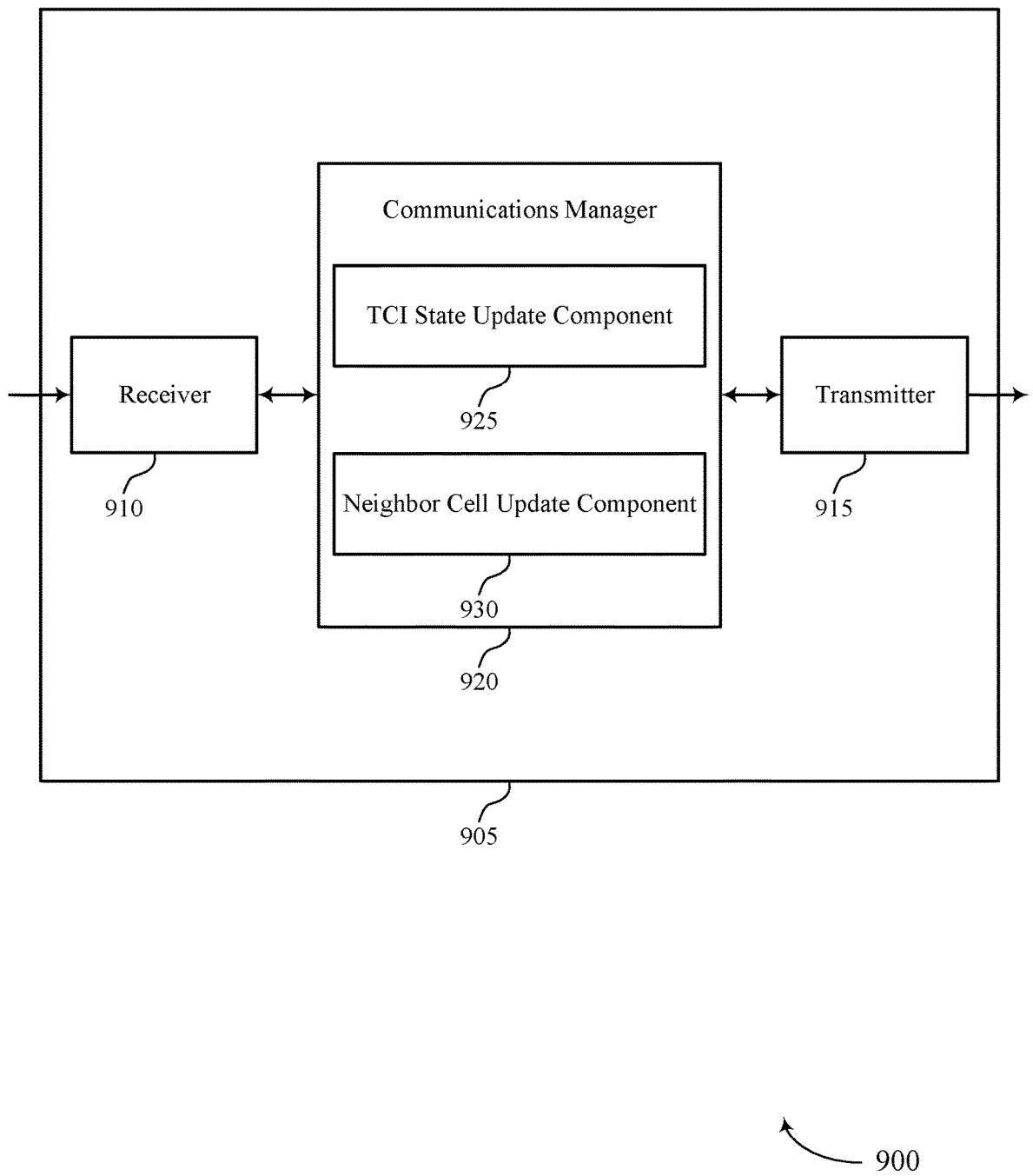

FIG. 9 shows a block diagram 900 of a device 905 that supports techniques for updating TCI states in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for updating TCI states). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for updating TCI states). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for updating TCI states as described herein. For example, the communications manager 920 may include a TCI state update component 925 a neighbor cell update component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The TCI state update component 925 may be configured as or otherwise support a means for transmitting, to a UE, an indication to update a TCI state of a first component carrier associated with a neighboring cell. The neighbor cell update component 930 may be configured as or otherwise support a means for transmitting a message including a neighboring cell update rule for updating the TCI state across multiple component carriers associated with the first component carrier.

Figure 10:
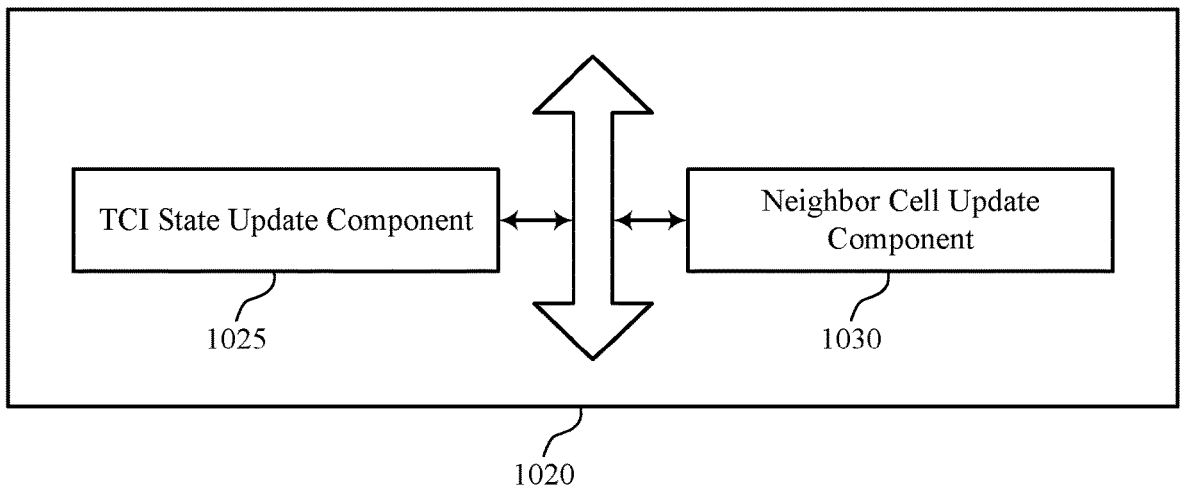
FIG. 10 shows a block diagram of a communications manager that supports techniques for updating TCI states in accordance with aspects of the present disclosure.

FIG. 10 shows a block diagram 1000 of a communications manager 1020 that supports techniques for updating TCI states in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for updating TCI states as described herein. For example, the communications manager 1020 may include a TCI state update component 1025 a neighbor cell update component 1030, or any combination thereof. Each of these components may communicate, directly or indirectly, with one another (e.g., via one or more buses).

The communications manager 1020 may support wireless communications at a base station in accordance with examples as disclosed herein. The TCI state update component 1025 may be configured as or otherwise support a means for transmitting, to a UE, an indication to update a TCI state of a first component carrier associated with a neighboring cell. The neighbor cell update component 1030 may be configured as or otherwise support a means for transmitting a message including a neighboring cell update rule for updating the TCI state across multiple component carriers associated with the first component carrier.

In some examples, to support transmitting the message including the neighboring cell update rule, the neighbor cell update component 1030 may be configured as or otherwise support a means for transmitting a RRC message including a bit, the bit indicating the neighboring cell update rule.

In some examples, the message including the neighboring cell update rule and the indication to update the TCI state are included in a same message, the same message being a RRC message, a MAC-CE message, or a DCI message.

In some examples, the TCI state update component 1025 may be configured as or otherwise support a means for transmitting a second message indicating the UE to update a set of multiple TCI states. In some examples, the neighbor cell update component 1030 may be configured as or otherwise support a means for transmitting a set of multiple neighboring cell update rules, each neighboring cell update rule of the set of multiple neighboring cell update rules associated with one of the set of multiple TCI states being updated.

In some examples, the neighboring cell update rule supports updating, by the UE, of the TCI state across the multiple component carriers.

In some examples, the neighboring cell update rule supports updating, by the UE, of the TCI state across the first component carrier only.

Figure 11:
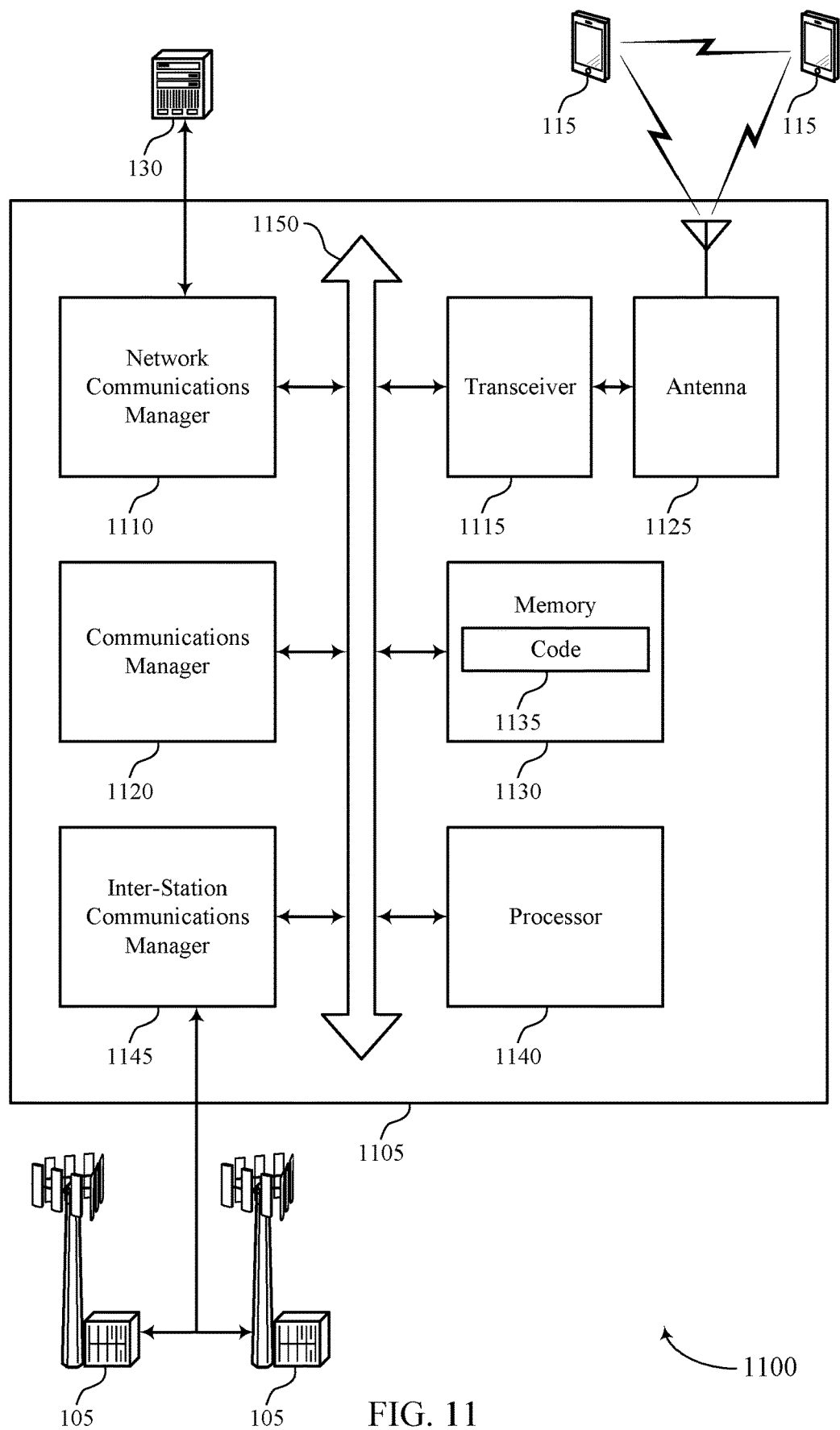
FIG. 11 shows a diagram of a system including a device that supports techniques for updating TCI states in accordance with aspects of the present disclosure.

FIG. 11 shows a diagram of a system 1100 including a device 1105 that supports techniques for updating TCI states in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for updating TCI states). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, an indication to update a TCI state of a first component carrier associated with a neighboring cell. The communications manager 1120 may be configured as or otherwise support a means for transmitting a message including a neighboring cell update rule for updating the TCI state across multiple component carriers associated with the first component carrier.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for updating TCI states as described herein, or the processor 1140 and the memory 1130 may be otherwise configured to perform or support such operations.

Figure 12:
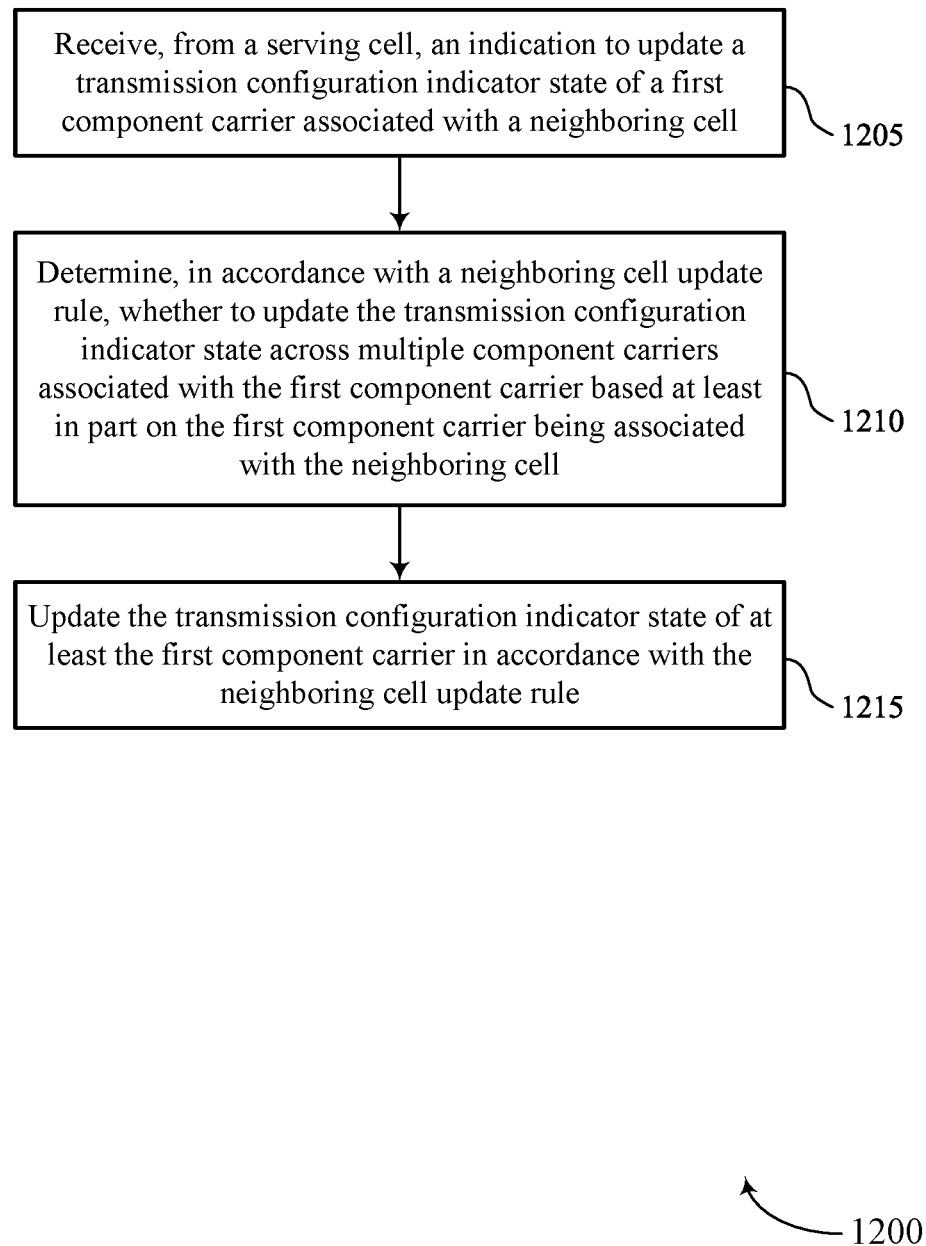
FIGS. 12 through 15 show flowcharts illustrating methods that support techniques for updating TCI states in accordance with aspects of the present disclosure.

FIG. 12 shows a flowchart illustrating a method 1200 that supports techniques for updating TCI states in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a serving cell, an indication to update a TCI state of a first component carrier associated with a neighboring cell. The operations of 1205 may be performed in accordance with examples as disclosed herein. In some examples, aspects of the operations of 1205 may be performed by a TCI state indication manager 625 as described with reference to FIG. 6.

At 1210, the method may include determining, in accordance with a neighboring cell update rule, whether to update the TCI state across multiple component carriers associated with the first component carrier based on the first component carrier being associated with the neighboring cell. The operations of 1210 may be performed in accordance with examples as disclosed herein. In some examples, aspects of the operations of 1210 may be performed by a component carrier manager 630 as described with reference to FIG. 6.

At 1215, the method may include updating the TCI state of at least the first component carrier in accordance with the neighboring cell update rule. The operations of 1215 may be performed in accordance with examples as disclosed herein. In some examples, aspects of the operations of 1215 may be performed by a TCI state update manager 635 as described with reference to FIG. 6.

Figure 13:
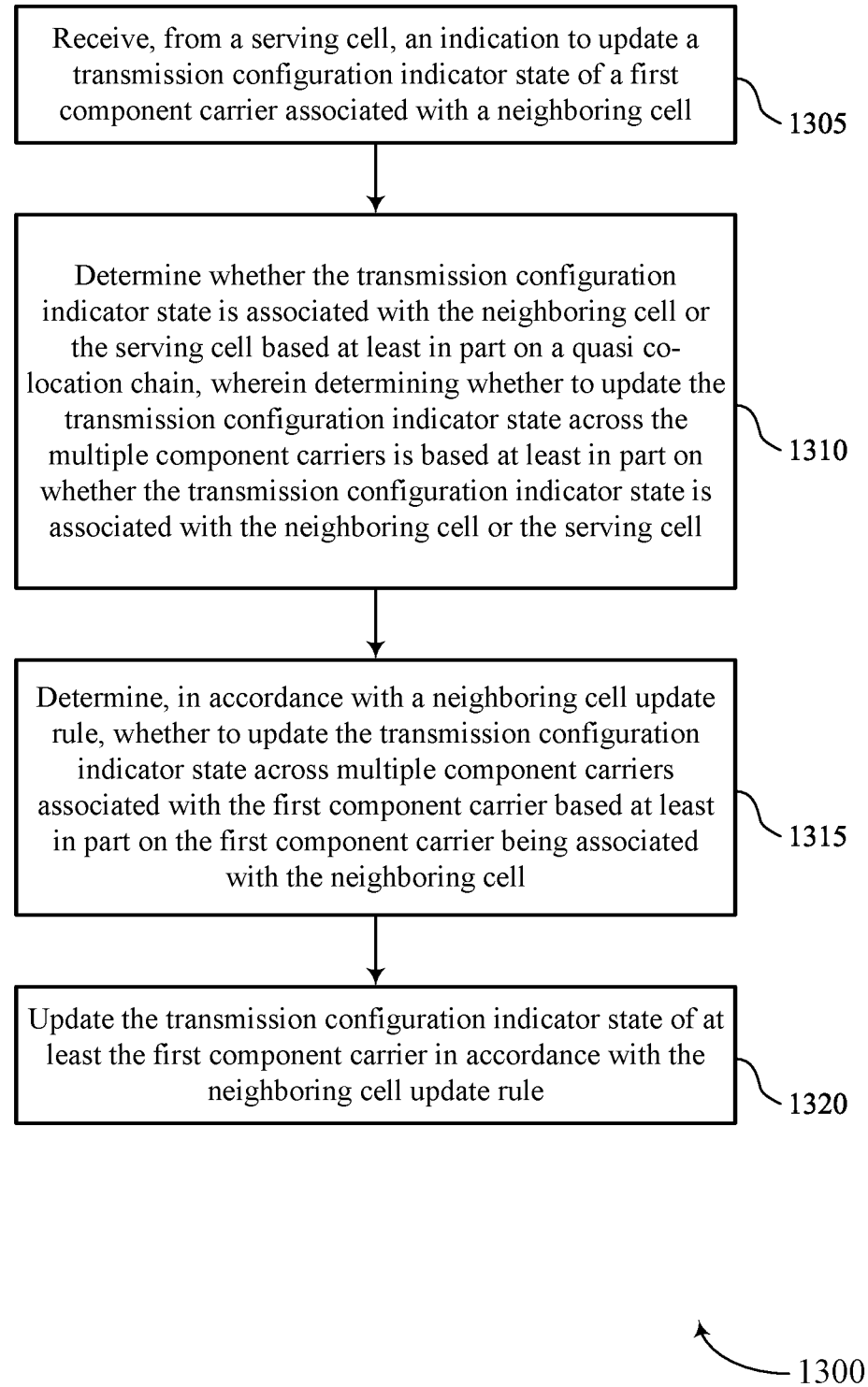

FIG. 13 shows a flowchart illustrating a method 1300 that supports techniques for updating TCI states in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a serving cell, an indication to update a TCI state of a first component carrier associated with a neighboring cell. The operations of 1305 may be performed in accordance with examples as disclosed herein. In some examples, aspects of the operations of 1305 may be performed by a TCI state indication manager 625 as described with reference to FIG. 6.

At 1310, the method may include determining whether the TCI state is associated with the neighboring cell or the serving cell based on a QCL chain, where determining whether to update the TCI state across the multiple component carriers is based on whether the TCI state is associated with the neighboring cell or the serving cell. The operations of 1310 may be performed in accordance with examples as disclosed herein. In some examples, aspects of the operations of 1310 may be performed by a cell determination manager 645 as described with reference to FIG. 6.

At 1315, the method may include determining, in accordance with a neighboring cell update rule, whether to update the TCI state across multiple component carriers associated with the first component carrier based on the first component carrier being associated with the neighboring cell. The operations of 1315 may be performed in accordance with examples as disclosed herein. In some examples, aspects of the operations of 1315 may be performed by a component carrier manager 630 as described with reference to FIG. 6.

At 1320, the method may include updating the TCI state of at least the first component carrier in accordance with the neighboring cell update rule. The operations of 1320 may be performed in accordance with examples as disclosed herein. In some examples, aspects of the operations of 1320 may be performed by a TCI state update manager 635 as described with reference to FIG. 6.

Figure 14:
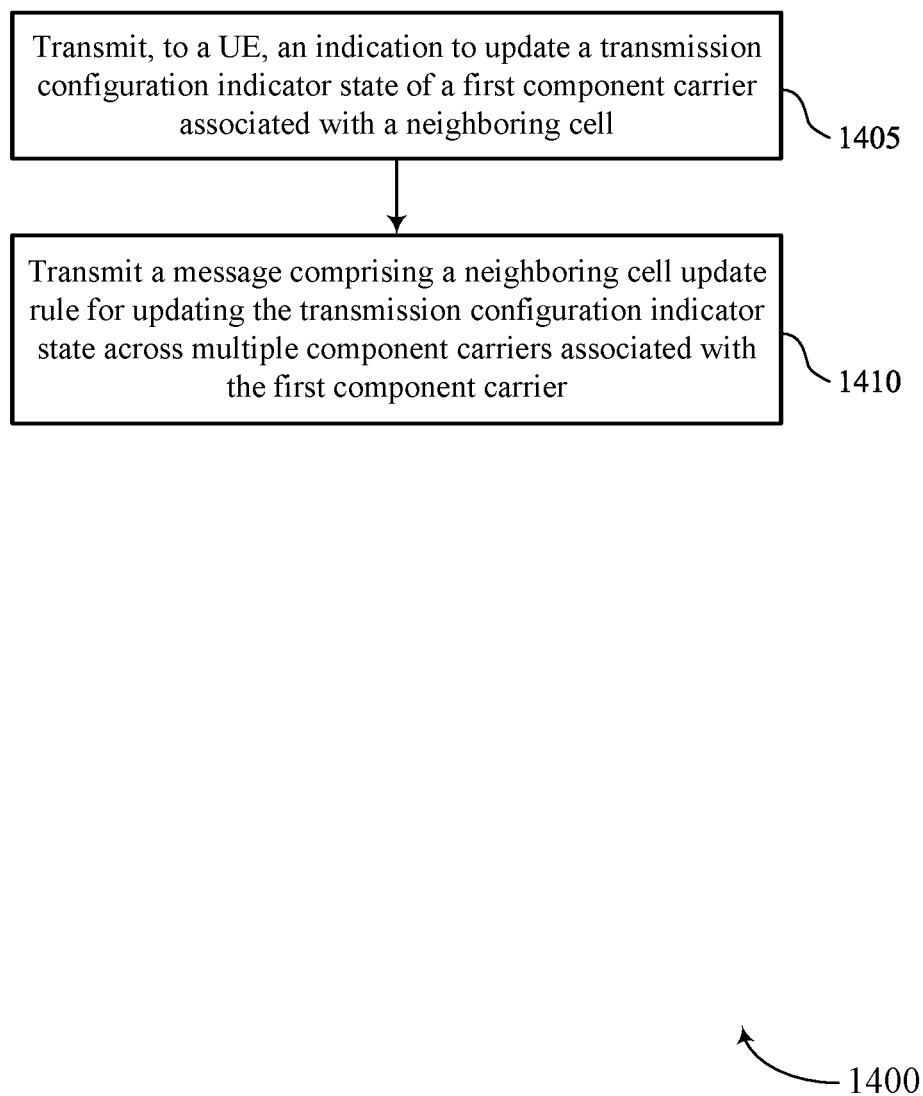

FIG. 14 shows a flowchart illustrating a method 1400 that supports techniques for updating TCI states in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, an indication to update a TCI state of a first component carrier associated with a neighboring cell. The operations of 1405 may be performed in accordance with examples as disclosed herein. In some examples, aspects of the operations of 1405 may be performed by a TCI state update component 1025 as described with reference to FIG. 10.

At 1410, the method may include transmitting a message including a neighboring cell update rule for updating the TCI state across multiple component carriers associated with the first component carrier. The operations of 1410 may be performed in accordance with examples as disclosed herein. In some examples, aspects of the operations of 1410 may be performed by a neighbor cell update component 1030 as described with reference to FIG. 10.

Figure 15:
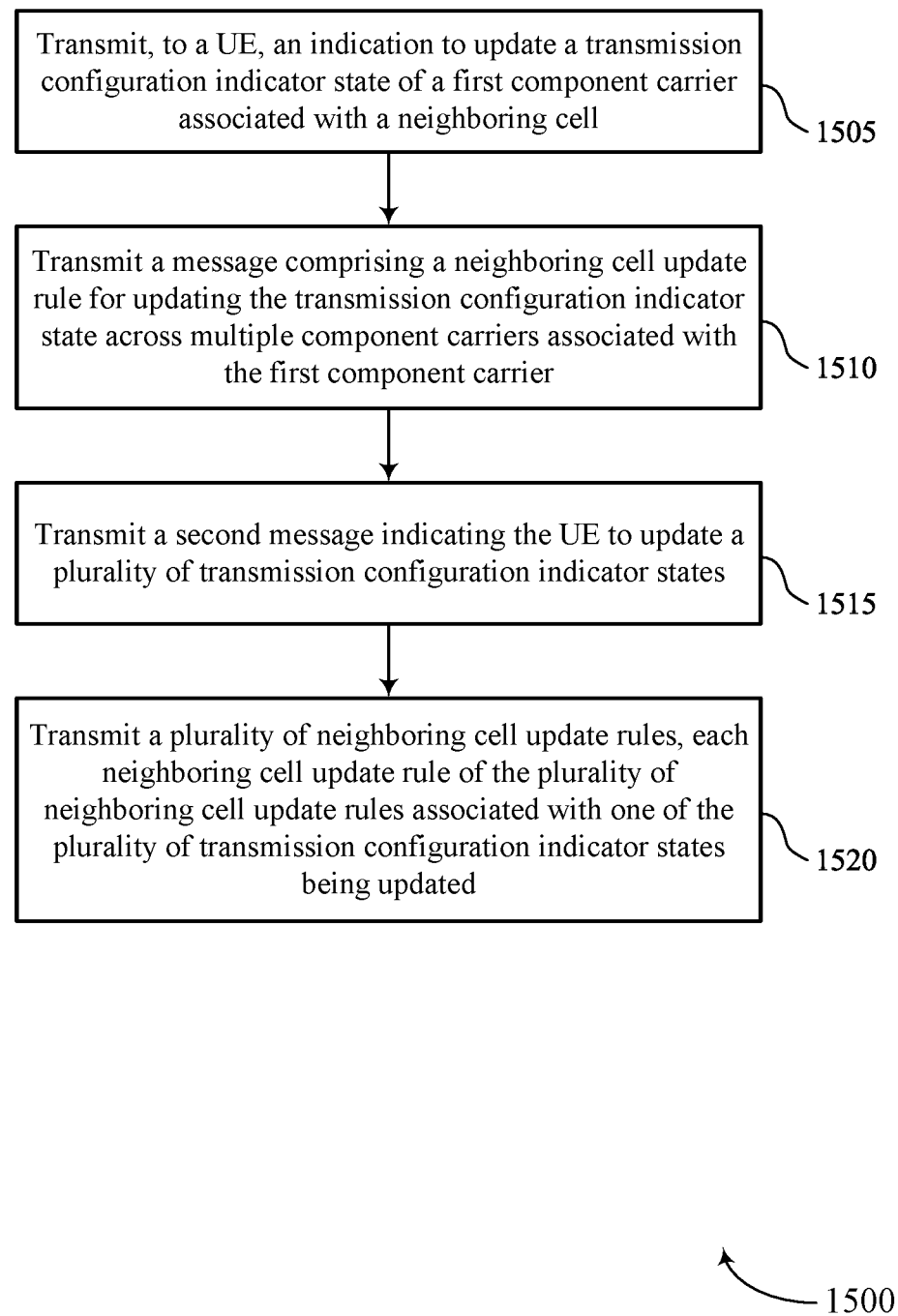

FIG. 15 shows a flowchart illustrating a method 1500 that supports techniques for updating TCI states in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, an indication to update a TCI state of a first component carrier associated with a neighboring cell. The operations of 1505 may be performed in accordance with examples as disclosed herein. In some examples, aspects of the operations of 1505 may be performed by a TCI state update component 1025 as described with reference to FIG. 10.

At 1510, the method may include transmitting a message including a neighboring cell update rule for updating the TCI state across multiple component carriers associated with the first component carrier. The operations of 1510 may be performed in accordance with examples as disclosed herein. In some examples, aspects of the operations of 1510 may be performed by a neighbor cell update component 1030 as described with reference to FIG. 10.

At 1515, the method may include transmitting a second message indicating the UE to update a set of multiple TCI states. The operations of 1515 may be performed in accordance with examples as disclosed herein. In some examples, aspects of the operations of 1515 may be performed by a TCI state update component 1025 as described with reference to FIG. 10.

At 1520, the method may include transmitting a set of multiple neighboring cell update rules, each neighboring cell update rule of the set of multiple neighboring cell update rules associated with one of the set of multiple TCI states being updated. The operations of 1520 may be performed in accordance with examples as disclosed herein. In some examples, aspects of the operations of 1520 may be performed by a neighbor cell update component 1030 as described with reference to FIG. 10.

The following provides an overview of aspects of the present disclosure:

Aspect 1: A method for wireless communications at a UE, comprising: receiving, from a serving cell, an indication to update a transmission configuration indicator state of a first component carrier associated with a neighboring cell; determining, in accordance with a neighboring cell update rule, whether to update the transmission configuration indicator state across multiple component carriers associated with the first component carrier based at least in part on the first component carrier being associated with the neighboring cell; and updating the transmission configuration indicator state of at least the first component carrier in accordance with the neighboring cell update rule.

Aspect 2: The method of aspect 1, wherein updating the transmission configuration indicator state further comprises: updating the transmission configuration indicator state across the first component carrier and the multiple component carriers in accordance with the neighboring cell update rule and based at least in part on the first component carrier and each component carrier of the multiple component carriers being included in a component carrier list, wherein the neighboring cell update rule supports updating of the transmission configuration indicator state across the multiple component carriers.

Aspect 3: The method of aspect 1, wherein updating the transmission configuration indicator state further comprises: updating the transmission configuration indicator state across the first component carrier only in accordance with the neighboring cell update rule, wherein the neighboring cell update rule supports updating of the transmission configuration indicator state for only the first component carrier despite the first component carrier and component carriers of the multiple component carriers being included in a component carrier list.

Aspect 4: The method of any of aspects 1 through 3, further comprising: receiving the neighboring cell update rule via a bit indication in a radio resource control message.

Aspect 5: The method of any of aspects 1 through 4, further comprising: receiving an indication of the neighboring cell update rule and the indication to update the transmission configuration indicator state in a same message, the same message being a radio resource control message, a medium access control element message, or a downlink control information message.

Aspect 6: The method of any of aspects 1 through 5, further comprising: receiving a message that indicates that the UE is to update a plurality of transmission configuration indicator states; and receiving one or more indications of a plurality of neighboring cell update rules, each neighboring cell update rule of the plurality of neighboring cell update rules associated with one of the plurality of transmission configuration indicator states being updated, wherein the UE updates the plurality of transmission configuration indicator states across one or more component carriers in accordance with the associated neighboring cell update rule.

Aspect 7: The method of any of aspects 1 through 6, further comprising: determining whether the transmission configuration indicator state is associated with the neighboring cell or the serving cell based at least in part on a quasi co-location chain, wherein determining whether to update the transmission configuration indicator state across the multiple component carriers is based at least in part on whether the transmission configuration indicator state is associated with the neighboring cell or the serving cell.

Aspect 8: The method of any of aspects 1 through 7, wherein determining whether to update the transmission configuration indicator state across the multiple component carriers further comprises: determining to update the transmission configuration indicator state of the first component carrier and to refrain from updating the transmission configuration indicator state across the multiple component carriers in accordance with the neighboring cell update rule and based at least in part on the first component carrier being associated with the neighboring cell.

Aspect 9: The method of any of aspects 1 through 8, wherein the transmission configuration indicator state is included in a pool of transmission configuration indicator states, the pool of transmission configuration indicator states associated with the first component carrier, updating the transmission configuration indicator state further comprises: updating the transmission configuration indicator state across the first component carrier only based at least in part on the pool of transmission configuration indicator states being associated with the first component carrier.

Aspect 10: The method of any of aspects 1 through 8, wherein the transmission configuration indicator state is included in a pool of transmission configuration indicator states, the pool of transmission configuration indicator states associated with the first component carrier and the multiple component carriers, updating the transmission configuration indicator state further comprises: updating the transmission configuration indicator state across the first component carrier and the multiple component carriers based at least in part on the pool of transmission configuration indicator states being associated with the first component carrier and the multiple component carriers.

Aspect 11: The method of any of aspects 1 through 10, further comprising: receiving a message indicating a bandwidth part identifier, the bandwidth part identifier associated with a bandwidth part included in the first component carrier; and determining that the transmission configuration indicator state is associated with the neighboring cell based at least in part on the bandwidth part identifier.

Aspect 12: The method of aspect 11, wherein updating the transmission configuration indicator state further comprises: updating the transmission configuration indicator state across the bandwidth part associated with the bandwidth part identifier in accordance with the neighboring cell update rule.

Aspect 13: The method of any of aspects 11 through 12, further comprising: determining one or more parameters associated with the neighboring cell based at least in part on the bandwidth part identifier.

Aspect 14: A method for wireless communications at a base station, comprising: transmitting, to a UE, an indication to update a transmission configuration indicator state of a first component carrier associated with a neighboring cell; and transmitting a message comprising a neighboring cell update rule for updating the transmission configuration indicator state across multiple component carriers associated with the first component carrier.

Aspect 15: The method of aspect 14, wherein transmitting the message comprising the neighboring cell update rule further comprises: transmitting a radio resource control message comprising a bit, the bit indicating the neighboring cell update rule.

Aspect 16: The method of any of aspects 14 through 15, wherein the message comprising the neighboring cell update rule and the indication to update the transmission configuration indicator state are included in a same message, the same message being a radio resource control message, a medium access control element message, or a downlink control information message.

Aspect 17: The method of any of aspects 14 through 16, further comprising: transmitting a second message indicating the UE to update a plurality of transmission configuration indicator states; and transmitting a plurality of neighboring cell update rules, each neighboring cell update rule of the plurality of neighboring cell update rules associated with one of the plurality of transmission configuration indicator states being updated.

Aspect 18: The method of any of aspects 14 through 17, wherein the neighboring cell update rule supports updating, by the UE, of the transmission configuration indicator state across the multiple component carriers.

Aspect 19: The method of any of aspects 14 through 18, wherein the neighboring cell update rule supports updating, by the UE, of the transmission configuration indicator state across the first component carrier only.

Aspect 20: An apparatus for wireless communications at a UE, comprising a processor; memory coupled with the processor; and instructions stored in the memory and executable by the processor to cause the apparatus to perform a method of any of aspects 1 through 13.

Aspect 21: An apparatus for wireless communications at a UE, comprising at least one means for performing a method of any of aspects 1 through 13.

Aspect 22: A non-transitory computer-readable medium storing code for wireless communications at a UE, the code comprising instructions executable by a processor to perform a method of any of aspects 1 through 13.

Aspect 23: An apparatus for wireless communications at a base station, comprising a processor; memory coupled with the processor; and instructions stored in the memory and executable by the processor to cause the apparatus to perform a method of any of aspects 14 through 19.

Aspect 24: An apparatus for wireless communications at a base station, comprising at least one means for performing a method of any of aspects 14 through 19.

Aspect 25: A non-transitory computer-readable medium storing code for wireless communications at a base station, the code comprising instructions executable by a processor to perform a method of any of aspects 14 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a serving cell, an indication to update a transmission configuration indicator state of a first component carrier associated with a neighboring cell, wherein the transmission configuration indicator state is updated differently depending on whether the transmission configuration indicator state is associated with one of: a first reference signal associated with the serving cell and a second reference signal associated with the neighboring cell;
   determining, in accordance with a neighboring cell update rule, whether to update the transmission configuration indicator state across multiple component carriers associated with the first component carrier based at least in part on the first component carrier being associated with the neighboring cell; and
   updating the transmission configuration indicator state of at least the first component carrier in accordance with the neighboring cell update rule.

2. The method of claim 1, wherein updating the transmission configuration indicator state further comprises:
   updating the transmission configuration indicator state across the first component carrier and the multiple component carriers in accordance with the neighboring cell update rule and based at least in part on the first component carrier and each component carrier of the multiple component carriers being included in a component carrier list, wherein the neighboring cell update rule supports updating of the transmission configuration indicator state across the multiple component carriers.

3. The method of claim 1, wherein updating the transmission configuration indicator state further comprises:
updating the transmission configuration indicator state across the first component carrier only in accordance with the neighboring cell update rule, wherein the neighboring cell update rule supports updating of the transmission configuration indicator state for only the first component carrier despite the first component carrier and component carriers of the multiple component carriers being included in a component carrier list.

4. The method of claim 1, further comprising:
receiving the neighboring cell update rule via a bit indication in a radio resource control message.

5. The method of claim 1, further comprising:
receiving an indication of the neighboring cell update rule and the indication to update the transmission configuration indicator state in a same message, the same message being a radio resource control message, a medium access control element message, or a downlink control information message.

6. The method of claim 1, further comprising:
receiving a message that indicates that the UE is to update a plurality of transmission configuration indicator states; and
receiving one or more indications of a plurality of neighboring cell update rules, each neighboring cell update rule of the plurality of neighboring cell update rules associated with one of the plurality of transmission configuration indicator states being updated, wherein the UE updates the plurality of transmission configuration indicator states across one or more component carriers in accordance with the associated neighboring cell update rule.

7. The method of claim 1, further comprising:
determining whether the transmission configuration indicator state is associated with the neighboring cell or the serving cell based at least in part on a quasi co-location chain, wherein determining whether to update the transmission configuration indicator state across the multiple component carriers is based at least in part on whether the transmission configuration indicator state is associated with the neighboring cell or the serving cell.

8. The method of claim 1, wherein determining whether to update the transmission configuration indicator state across the multiple component carriers further comprises:
determining to update the transmission configuration indicator state of the first component carrier and to refrain from updating the transmission configuration indicator state across the multiple component carriers in accordance with the neighboring cell update rule and based at least in part on the first component carrier being associated with the neighboring cell.

9. The method of claim 1, wherein the transmission configuration indicator state is included in a pool of transmission configuration indicator states, the pool of transmission configuration indicator states associated with the first component carrier, updating the transmission configuration indicator state further comprises:
updating the transmission configuration indicator state across the first component carrier only based at least in part on the pool of transmission configuration indicator states being associated with the first component carrier.

10. The method of claim 1, wherein the transmission configuration indicator state is included in a pool of transmission configuration indicator states, the pool of transmission configuration indicator states associated with the first component carrier and the multiple component carriers, updating the transmission configuration indicator state further comprises:
updating the transmission configuration indicator state across the first component carrier and the multiple component carriers based at least in part on the pool of transmission configuration indicator states being associated with the first component carrier and the multiple component carriers.

11. The method of claim 1, further comprising:
receiving a message indicating a bandwidth part identifier, the bandwidth part identifier associated with a bandwidth part included in the first component carrier; and
determining that the transmission configuration indicator state is associated with the neighboring cell based at least in part on the bandwidth part identifier.

12. The method of claim 11, wherein updating the transmission configuration indicator state further comprises:
updating the transmission configuration indicator state across the bandwidth part associated with the bandwidth part identifier in accordance with the neighboring cell update rule.

13. The method of claim 11, further comprising:
determining one or more parameters associated with the neighboring cell based at least in part on the bandwidth part identifier.

14. A method for wireless communications at a base station, comprising:
transmitting, to a user equipment (UE), an indication to update a transmission configuration indicator state of a first component carrier associated with a neighboring cell, wherein the transmission configuration indicator state is updated differently depending on whether the transmission configuration indicator state is associated with one of: a first reference signal associated with a serving cell and a second reference signal associated with the neighboring cell; and
transmitting a message comprising a neighboring cell update rule for updating the transmission configuration indicator state across multiple component carriers associated with the first component carrier.

15. The method of claim 14, wherein transmitting the message comprising the neighboring cell update rule further comprises:
transmitting a radio resource control message comprising a bit, the bit indicating the neighboring cell update rule.

16. The method of claim 14, wherein the message comprising the neighboring cell update rule and the indication to update the transmission configuration indicator state are included in a same message, the same message being a radio resource control message, a medium access control element message, or a downlink control information message.

17. The method of claim 14, further comprising:
transmitting a second message indicating the UE to update a plurality of transmission configuration indicator states; and
transmitting a plurality of neighboring cell update rules, each neighboring cell update rule of the plurality of neighboring cell update rules associated with one of the plurality of transmission configuration indicator states being updated.

18. The method of claim 14, wherein the neighboring cell update rule supports updating, by the UE, of the transmission configuration indicator state across the multiple component carriers.

19. The method of claim 14, wherein the neighboring cell update rule supports updating, by the UE, of the transmission configuration indicator state across the first component carrier only.

20. An apparatus for wireless communications at a user equipment (UE), comprising:
a processor;
memory coupled with the processor; and
instructions stored in the memory and executable by the processor to cause the apparatus to:
receive, from a serving cell, an indication to update a transmission configuration indicator state of a first component carrier associated with a neighboring cell, wherein the transmission configuration indicator state is updated differently depending on whether the transmission configuration indicator state is associated with one of: a first reference signal associated with the serving cell and a second reference signal associated with the neighboring cell;
determine, in accordance with a neighboring cell update rule, whether to update the transmission configuration indicator state across multiple component carriers associated with the first component carrier based at least in part on the first component carrier being associated with the neighboring cell; and
update the transmission configuration indicator state of at least the first component carrier in accordance with the neighboring cell update rule.

21. The apparatus of claim 20, wherein the instructions to update the transmission configuration indicator state are further executable by the processor to cause the apparatus to update the transmission configuration indicator state across the first component carrier and the multiple component carriers in accordance with the neighboring cell update rule and based at least in part on the first component carrier and each component carrier of the multiple component carriers being included in a component carrier list, wherein the neighboring cell update rule supports updating of the transmission configuration indicator state across the multiple component carriers.

22. The apparatus of claim 20, wherein the instructions to update the transmission configuration indicator state are further executable by the processor to cause the apparatus to update the transmission configuration indicator state across the first component carrier only in accordance with the neighboring cell update rule, wherein the neighboring cell update rule supports updating of the transmission configuration indicator state for only the first component carrier despite the first component carrier and component carriers of the multiple component carriers being included in a component carrier list.

23. The apparatus of claim 20, wherein the instructions are further executable by the processor to cause the apparatus to:
receive the neighboring cell update rule via a bit indication in a radio resource control message.

24. The apparatus of claim 20, wherein the instructions are further executable by the processor to cause the apparatus to:
receive an indication of the neighboring cell update rule and the indication to update the transmission configuration indicator state in a same message, the same message being a radio resource control message, a medium access control element message, or a downlink control information message.

25. The apparatus of claim 20, wherein the instructions are further executable by the processor to cause the apparatus to:
receive a message that indicates that the UE is to update a plurality of transmission configuration indicator states; and
receive one or more indications of a plurality of neighboring cell update rules, each neighboring cell update rule of the plurality of neighboring cell update rules associated with one of the plurality of transmission configuration indicator states being updated, wherein the UE updates the plurality of transmission configuration indicator states across one or more component carriers in accordance with the associated neighboring cell update rule.

26. The apparatus of claim 20, wherein the instructions are further executable by the processor to cause the apparatus to:
determine whether the transmission configuration indicator state is associated with the neighboring cell or the serving cell based at least in part on a quasi co-location chain, wherein determining whether to update the transmission configuration indicator state across the multiple component carriers is based at least in part on whether the transmission configuration indicator state is associated with the neighboring cell or the serving cell.

27. An apparatus for wireless communications at a base station, comprising:
a processor;
memory coupled with the processor; and
instructions stored in the memory and executable by the processor to cause the apparatus to:
transmit, to a user equipment (UE), an indication to update a transmission configuration indicator state of a first component carrier associated with a neighboring cell, wherein the transmission configuration indicator state is updated differently depending on whether the transmission configuration indicator state is associated with one of: a first reference signal associated with a serving cell and a second reference signal associated with the neighboring cell; and
transmit a message comprising a neighboring cell update rule for updating the transmission configuration indicator state across multiple component carriers associated with the first component carrier.

28. The apparatus of claim 27, wherein the instructions to transmit the message comprising the neighboring cell update rule are further executable by the processor to cause the apparatus to transmit a radio resource control message comprising a bit, the bit indicating the neighboring cell update rule.

29. The apparatus of claim 27, wherein the message comprising the neighboring cell update rule and the indication to update the transmission configuration indicator state are included in a same message, the same message being a radio resource control message, a medium access control element message, or a downlink control information message.

30. The apparatus of claim 27, wherein the instructions are further executable by the processor to cause the apparatus to:

transmit a second message indicating the UE to update a plurality of transmission configuration indicator states; and transmit a plurality of neighboring cell update rules, each neighboring cell update rule of the plurality of neighboring cell update rules associated with one of the plurality of transmission configuration indicator states being updated.

* * * * *